(12) United States Patent
Cvelbar

(10) Patent No.: US 10,933,387 B2
(45) Date of Patent: Mar. 2, 2021

(54) REDUCING AGENT MIXER

(71) Applicant: FAURECIA EMISSIONS CONTROL TECHNOLOGIES, USA, LLC, Columbus (IN)

(72) Inventor: Randy Cvelbar, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 34 days.

(21) Appl. No.: 16/328,299

(22) PCT Filed: Oct. 21, 2016

(86) PCT No.: PCT/US2016/058114
§ 371 (c)(1),
(2) Date: Feb. 26, 2019

(87) PCT Pub. No.: WO2018/075061
PCT Pub. Date: Apr. 26, 2018

(65) Prior Publication Data
US 2019/0201854 A1 Jul. 4, 2019

(51) Int. Cl.
*B01F 3/04* (2006.01)
*B01F 5/04* (2006.01)
(Continued)

(52) U.S. Cl.
CPC .......... *B01F 3/04049* (2013.01); *B01D 53/90* (2013.01); *B01D 53/94* (2013.01);
(Continued)

(58) Field of Classification Search
CPC combination set(s) only.
See application file for complete search history.

(56) References Cited

U.S. PATENT DOCUMENTS

| | | |
|---|---|---|
| 1,462,219 A | 7/1923 | Wagner |
| 3,524,631 A | 8/1970 | Mare |
| (Continued) | | |

FOREIGN PATENT DOCUMENTS

| | | |
|---|---|---|
| CN | 1370092 | 8/1999 |
| CN | 1448620 | 3/2002 |
| (Continued) | | |

OTHER PUBLICATIONS

PCT International Search Report and Written Opinion completed by the ISA/US dated Dec. 17, 2016 and issued in connection with PCT/US2016/058114.
(Continued)

*Primary Examiner* — Binh Q Tran
(74) *Attorney, Agent, or Firm* — Barnes & Thornburg LLP

(57) ABSTRACT

The present disclosure relates to mixing devices included in automotive exhaust treatment systems. More particularly, the present disclosure relates to reducing agent mixers for mixing reducing agents with exhaust streams to induce a chemical reaction between the reducing agent and exhaust gasses to reduce Nitrous Oxides (NOx) in the exhaust gas. Reducing agent mixers in accordance with the present disclosure include reducing agent delivery devices for conducting reducing agents into an internal mixing space through which exhaust gasses flow.

18 Claims, 8 Drawing Sheets

Figure 1:
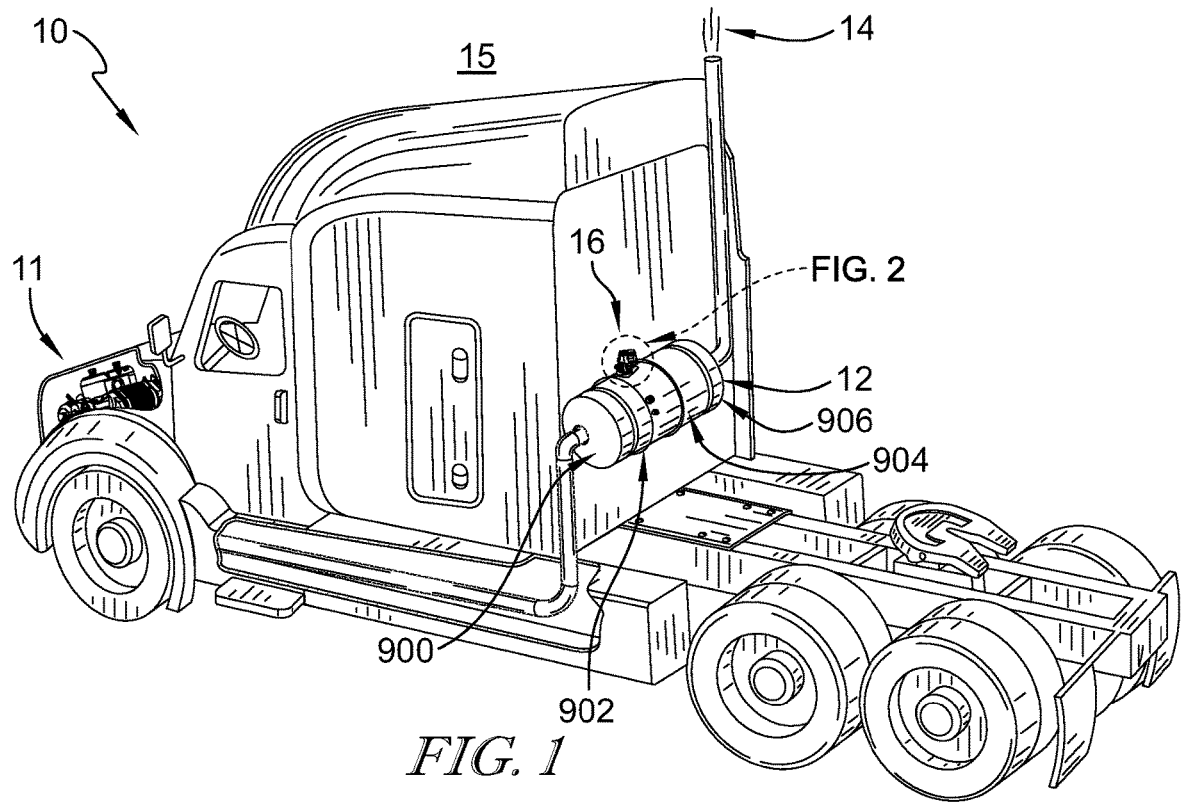

(51) Int. Cl.
- *B01F 5/06* (2006.01)
- *F01N 3/20* (2006.01)
- *F01N 3/28* (2006.01)
- *B01D 53/94* (2006.01)
- *B01D 53/90* (2006.01)
- *B01F 5/00* (2006.01)
- *F01N 3/021* (2006.01)
- *F01N 3/10* (2006.01)

(52) U.S. Cl.
CPC ........ *B01D 53/9431* (2013.01); *B01F 5/0065* (2013.01); *B01F 5/0473* (2013.01); *B01F 5/0614* (2013.01); *B01F 5/0644* (2013.01); *F01N 3/2066* (2013.01); *F01N 3/2892* (2013.01); *B01D 2251/2067* (2013.01); *B01D 2258/012* (2013.01); *B01D 2259/124* (2013.01); *B01F 2005/0091* (2013.01); *F01N 3/021* (2013.01); *F01N 3/103* (2013.01); *F01N 3/106* (2013.01); *F01N 2240/20* (2013.01); *F01N 2610/02* (2013.01); *F01N 2610/1453* (2013.01); *Y02C 20/10* (2013.01)

(56) References Cited

U.S. PATENT DOCUMENTS

| | | | |
|---|---|---|---|
| 4,054,418 A | 10/1977 | Miller | |
| 4,094,934 A | 6/1978 | Tuckey | |
| 4,538,413 A | 9/1985 | Shinzawa | |
| 4,576,617 A | 3/1986 | Renevot | |
| 5,605,042 A | 2/1997 | Stutzenberger | |
| 5,606,856 A | 3/1997 | Linder | |
| 5,648,022 A | 7/1997 | Gohara | |
| 5,826,428 A | 10/1998 | Blaschke | |
| 6,192,677 B1 | 2/2001 | Tost | |
| 6,382,600 B1 | 5/2002 | Mahr | |
| 6,460,340 B1 | 10/2002 | Chauvette | |
| 6,513,323 B1 | 2/2003 | Weigl | |
| 6,516,610 B2 | 2/2003 | Hodgson | |
| 6,539,708 B1 | 4/2003 | Hofmann | |
| 6,637,196 B1 | 10/2003 | Tost | |
| 6,722,123 B2 | 4/2004 | Liu | |
| 6,755,014 B2 | 6/2004 | Kawai | |
| 7,448,206 B2 | 11/2008 | Meingast | |
| 7,509,799 B2 | 3/2009 | Amou | |
| 7,784,273 B2 | 8/2010 | Kanaya | |
| 7,980,063 B2 | 7/2011 | Cooke | |
| 7,992,379 B2 | 8/2011 | Suzuki | |
| 8,033,101 B2 | 10/2011 | Amon | |
| 8,079,211 B2 | 12/2011 | Levin | |
| 8,173,088 B2 | 5/2012 | Makartchouk | |
| 8,216,537 B2 | 7/2012 | Kouvetakis | |
| 8,438,839 B2 | 5/2013 | Floyd | |
| 8,607,550 B2 | 12/2013 | Tangemann | |
| 8,622,316 B2 | 1/2014 | Haeberer | |
| 8,661,792 B2 | 3/2014 | Greber | |
| 8,726,640 B2 * | 5/2014 | Tilinski | F01N 3/2066 60/286 |
| 8,726,643 B2 | 5/2014 | Way | |
| 8,800,276 B2 | 8/2014 | Levin | |
| 8,916,100 B2 | 12/2014 | Iijima | |
| 8,932,530 B2 | 1/2015 | Iijima | |
| 9,003,775 B2 | 4/2015 | Wright | |
| 9,180,407 B2 | 11/2015 | De Rudder | |
| 9,188,039 B2 | 11/2015 | Nagel | |
| 9,266,075 B2 | 2/2016 | Chapman | |
| 9,308,495 B2 | 4/2016 | Kimura | |
| 9,664,081 B2 * | 5/2017 | Rusch | F01N 3/2892 |
| 2002/0108368 A1 | 8/2002 | Hodgson | |
| 2003/0079467 A1 * | 5/2003 | Liu | B01F 3/04049 60/286 |
| 2003/0110763 A1 | 6/2003 | Pawson | |
| 2003/0182935 A1 | 10/2003 | Kawai | |
| 2003/0226412 A1 | 12/2003 | Rumminger | |
| 2006/0070374 A1 | 4/2006 | Gaiser | |
| 2006/0218902 A1 | 10/2006 | Arellano | |
| 2007/0092413 A1 | 4/2007 | Hirata | |
| 2007/0163241 A1 | 7/2007 | Meingast | |
| 2007/0193252 A1 | 8/2007 | McKinley | |
| 2008/0011777 A1 | 1/2008 | Cooke | |
| 2008/0011780 A1 | 1/2008 | Cooke | |
| 2008/0022663 A1 | 1/2008 | Dodge | |
| 2008/0022670 A1 | 1/2008 | Ichikawa | |
| 2008/0092526 A1 | 4/2008 | Kunkel | |
| 2008/0163612 A1 | 7/2008 | Gaiser | |
| 2008/0223022 A1 | 9/2008 | Amon | |
| 2008/0256931 A1 | 10/2008 | Kawakita | |
| 2008/0282687 A1 | 11/2008 | Park | |
| 2008/0295497 A1 | 12/2008 | Kornherr | |
| 2009/0019837 A1 | 1/2009 | Suzuki | |
| 2009/0019842 A1 | 1/2009 | Suzuki | |
| 2009/0019843 A1 | 1/2009 | Levin | |
| 2009/0044524 A1 | 2/2009 | Fujino | |
| 2009/0064668 A1 | 3/2009 | Herrick | |
| 2009/0084094 A1 | 4/2009 | Goss | |
| 2009/0107126 A1 | 4/2009 | Bugos | |
| 2009/0120066 A1 | 5/2009 | VanderGriend | |
| 2009/0127511 A1 | 5/2009 | Bruck | |
| 2009/0158717 A1 | 6/2009 | Kimura | |
| 2010/0005790 A1 | 1/2010 | Zhang | |
| 2010/0005791 A1 | 1/2010 | Ranganathan | |
| 2010/0071355 A1 | 3/2010 | Brown | |
| 2010/0083643 A1 | 4/2010 | Hayashi | |
| 2010/0101222 A1 | 4/2010 | Oesterle | |
| 2010/0107614 A1 | 5/2010 | Levin | |
| 2010/0186393 A1 | 7/2010 | Kowada | |
| 2010/0196225 A1 | 8/2010 | Harinath | |
| 2010/0212292 A1 | 8/2010 | Rusch | |
| 2010/0212301 A1 | 8/2010 | De Rudder | |
| 2010/0263359 A1 | 10/2010 | Haverkamp | |
| 2011/0036082 A1 | 2/2011 | Collinot | |
| 2011/0061374 A1 | 3/2011 | Noritake | |
| 2011/0079003 A1 | 4/2011 | Sun | |
| 2011/0088376 A1 | 4/2011 | Kowada | |
| 2011/0094206 A1 * | 4/2011 | Liu | F01N 3/2892 60/274 |
| 2011/0107743 A1 | 5/2011 | Ranganathan | |
| 2011/0113759 A1 | 5/2011 | Tilinski | |
| 2011/0126529 A1 | 6/2011 | Park | |
| 2011/0274590 A1 | 11/2011 | Floyd | |
| 2011/0308234 A1 | 12/2011 | De Rudder | |
| 2012/0020854 A1 | 1/2012 | Makartchouk | |
| 2012/0090305 A1 | 4/2012 | Floyd | |
| 2012/0174561 A1 | 7/2012 | Troxler | |
| 2012/0216513 A1 | 8/2012 | Greber | |
| 2012/0322012 A1 | 12/2012 | Tsumagari | |
| 2012/0324872 A1 | 12/2012 | Jaruvatee | |
| 2013/0061577 A1 | 3/2013 | Floyd | |
| 2013/0152558 A1 | 6/2013 | Loman | |
| 2013/0164182 A1 | 6/2013 | Iijima | |
| 2013/0164183 A1 | 6/2013 | Iijima | |
| 2013/0167516 A1 | 7/2013 | Loman | |
| 2013/0174537 A1 | 7/2013 | Loman | |
| 2013/0239546 A1 | 9/2013 | Levin | |
| 2013/0269325 A1 | 10/2013 | Hadden | |
| 2013/0291519 A1 | 11/2013 | Patel | |
| 2014/0079599 A1 | 3/2014 | Hill | |
| 2014/0196440 A1 | 7/2014 | Katou | |
| 2014/0196441 A1 | 7/2014 | Katou | |
| 2014/0196442 A1 | 7/2014 | Katou | |
| 2014/0196444 A1 | 7/2014 | Watahiki | |
| 2014/0311133 A1 | 10/2014 | Norling | |
| 2014/0325967 A1 | 11/2014 | Kimura | |
| 2014/0334987 A1 | 11/2014 | Stanavich | |
| 2014/0334988 A1 | 11/2014 | Stanavich | |
| 2015/0040537 A1 | 2/2015 | Hicks | |
| 2015/0047329 A1 | 2/2015 | Way | |
| 2015/0071826 A1 | 3/2015 | Sampath | |
| 2015/0101313 A1 | 4/2015 | Mitchell | |
| 2015/0101318 A1 | 4/2015 | Munnannur | |
| 2015/0135683 A1 * | 5/2015 | Petry | F01N 3/2066 60/286 |
| 2015/0152766 A1 | 6/2015 | Brunel | |

(56) References Cited

U.S. PATENT DOCUMENTS

| | | | |
|---|---|---|---|
| 2015/0167525 A1 | 6/2015 | Assalve | |
| 2015/0290585 A1 | 10/2015 | Nagata | |
| 2015/0361853 A1 | 12/2015 | Nagata | |
| 2016/0032808 A1 | 2/2016 | Kobe | |
| 2016/0184783 A1 | 6/2016 | Tyni | |
| 2016/0319723 A1* | 11/2016 | Alano | B01F 5/0614 |
| 2018/0142597 A1* | 5/2018 | Riepshoff | F01N 3/2066 |

FOREIGN PATENT DOCUMENTS

| | | |
|---|---|---|
| DE | 19856366 C1 | 4/2000 |
| DE | 4417238 | 3/2003 |
| DE | 19806265 | 7/2004 |
| DE | 10248294 | 10/2005 |
| DE | 10306134 | 5/2006 |
| DE | 10312212 | 9/2006 |
| DE | 102006003786 | 4/2007 |
| DE | 102005061145 | 6/2007 |
| DE | 102005061145 A1 | 6/2007 |
| DE | 102006011655 | 9/2007 |
| DE | 202007010324 | 11/2008 |
| DE | 102008023585 | 1/2009 |
| DE | 102008032109 | 1/2009 |
| DE | 102007051510 | 4/2009 |
| DE | 102007052262 | 5/2009 |
| DE | 202008001022 | 6/2009 |
| DE | 102008008563 | 8/2009 |
| DE | 102008008564 | 8/2009 |
| DE | 102008041486 | 2/2010 |
| DE | 102008059602 | 6/2010 |
| DE | 102009036511 | 2/2011 |
| DE | 102009046280 | 5/2011 |
| DE | 112009001055 | 7/2011 |
| DE | 102011008895 | 7/2012 |
| DE | 102008040476 | 4/2013 |
| DE | 102008052757 | 2/2014 |
| DE | 102008032110 | 2/2015 |
| DE | 102013012909 | 2/2015 |
| DE | 102014104224 | 10/2015 |
| DE | 10241697 | 5/2016 |
| EP | 0268026 | 8/1993 |
| EP | 0956895 | 11/1999 |
| EP | 1008732 | 3/2004 |
| EP | 1314864 | 1/2007 |
| EP | 2221459 | 8/2010 |
| EP | 2282026 | 2/2011 |
| EP | 2295755 | 3/2011 |
| EP | 2405109 | 1/2012 |
| EP | 2492465 | 8/2012 |
| EP | 2465602 | 11/2013 |
| EP | 2687286 | 1/2014 |
| EP | 2295756 | 3/2014 |
| EP | 1990513 | 9/2014 |
| EP | 2860369 | 4/2015 |
| EP | 2860370 | 4/2015 |
| EP | 2325452 | 5/2015 |
| EP | 2884069 | 6/2015 |
| EP | 2980379 | 2/2016 |
| EP | 3018311 | 5/2016 |
| FR | 2897646 | 8/2008 |
| FR | 2965011 | 3/2012 |
| FR | 2977632 | 1/2013 |
| JP | H2223624 | 2/1989 |
| JP | H0296212 | 4/1990 |
| JP | 2005127271 | 5/2005 |
| JP | 2007000783 | 1/2007 |
| JP | 2007000784 | 1/2007 |
| JP | 2007146700 | 6/2007 |
| JP | 2008014213 | 1/2008 |
| JP | 2009030560 | 2/2009 |
| JP | 2009156068 | 7/2009 |
| JP | 2009156069 | 7/2009 |
| JP | 2009209822 | 9/2009 |
| JP | 2013002367 | 1/2013 |
| KR | 20090069237 | 6/2009 |
| KR | 20090105593 | 10/2009 |
| KR | 2012053494 A | 5/2012 |
| SE | 531199 | 1/2009 |
| WO | 9701387 | 10/1997 |
| WO | 2000066885 | 11/2000 |
| WO | 2006123511 | 11/2006 |
| WO | 2007073957 | 7/2007 |
| WO | 2007115748 | 10/2007 |
| WO | 2008027146 | 3/2008 |
| WO | 2008034981 | 3/2008 |
| WO | 2008080695 | 7/2008 |
| WO | 2008122724 | 10/2008 |
| WO | 2009012859 | 1/2009 |
| WO | 2009012885 | 1/2009 |
| WO | 2009030858 | 3/2009 |
| WO | 2009068136 | 6/2009 |
| WO | 2009098096 | 8/2009 |
| WO | 2010055239 | 5/2010 |
| WO | 2010056793 | 5/2010 |
| WO | 2010078052 | 7/2010 |
| WO | 2010088208 | 8/2010 |
| WO | 2010149410 | 12/2010 |
| WO | 2011043993 | 4/2011 |
| WO | 2011056676 | 5/2011 |
| WO | 2011106487 | 9/2011 |
| WO | 2011110885 | 9/2011 |
| WO | 2011139953 | 11/2011 |
| WO | 2011163395 | 12/2011 |
| WO | 2012013562 | 2/2012 |
| WO | 2012044233 | 4/2012 |
| WO | 2012047159 | 4/2012 |
| WO | 2012050509 | 4/2012 |
| WO | 2012052560 | 4/2012 |
| WO | 2012053960 | 4/2012 |
| WO | 2012054437 | 4/2012 |
| WO | 2012096971 | 7/2012 |
| WO | 2012120000 | 9/2012 |
| WO | 2013010700 | 1/2013 |
| WO | 2013035112 | 3/2013 |
| WO | 2013036406 | 3/2013 |
| WO | 2013048309 | 4/2013 |
| WO | 2013099312 | 7/2013 |
| WO | 2013099313 | 7/2013 |
| WO | 2013099314 | 7/2013 |
| WO | 2013112154 | 8/2013 |
| WO | 2013178321 | 12/2013 |
| WO | 2014017310 | 1/2014 |
| WO | 2014047091 | 3/2014 |
| WO | 2014051617 | 4/2014 |
| WO | 2014077023 | 5/2014 |
| WO | 2014112063 | 7/2014 |
| WO | 2014112067 | 7/2014 |
| WO | 2014112072 | 7/2014 |
| WO | 2014112073 | 7/2014 |
| WO | 2014115461 | 7/2014 |
| WO | 2014182832 | 11/2014 |
| WO | 2015012829 | 1/2015 |
| WO | 2015018971 | 2/2015 |
| WO | 2015020820 | 2/2015 |
| WO | 201574926 | 5/2015 |
| WO | 201576765 | 5/2015 |
| WO | 2015130640 | 9/2015 |
| WO | 2015151282 | 10/2015 |
| WO | 2015187128 | 12/2015 |
| WO | 2016013319 | 1/2016 |

OTHER PUBLICATIONS

International Search Report for PCT International Application Serial No. PCT/EP2008/005170, completed Sep. 22, 2008, (4 pages).
International Preliminary Report on Patentability for PCT Application Serial No. PCT/EP2008/005170,dated Mar. 9, 2010, (6 pages).
International Search Report for PCT International Application Serial No. PCT/US2016/058114, 9 pages.
Jean et al., New Concepts for the Urea Injection Area in SCR Exhaust Systems for Passenger Cars, Aachen Congress, p. 1373-1390, 2010, 18 pages.

(56) References Cited

OTHER PUBLICATIONS

Rusch et al., Urea SCR Interaction of Spray Generation and Exhaust System, 3rd International CTI Forum SCR-System, Bonn, Apr. 2008, 30 pages.
DE102005061145A1 translation.
Office Action dated Jan. 19, 2018 for U.S. Appl. No. 12/670,126; (pp. 1-10).
Extended European Search Report for European App. No. 14893926.7 dated Jan. 1, 2018, 9 pages.
Office Action dated May 10, 2018 for U.S. Appl. No. 15/315,046, (pp. 1-9).
Korean Office Action for Korean Pat. App. No. 10-2016-7036917, 16 pages, English translation included.
Office Action dated Jun. 14, 2018 for U.S. Appl. No. 15/365,440, (pp. 1-9).
International Search Report for International Application No. PCT/US2014/040588, dated Feb. 6, 2015, 3 pages.
European Search Report for European Application No. EP16786933, dated Nov. 20, 2018, 8 pages.
Korean Office Action for Korean Patent Application No. 10-2017-7033225, dated Feb. 25, 2019, 17 pages.
Japanese Office Action for Application No. 2017-556631, dated Nov. 20, 2018, 9 pages.

\* cited by examiner

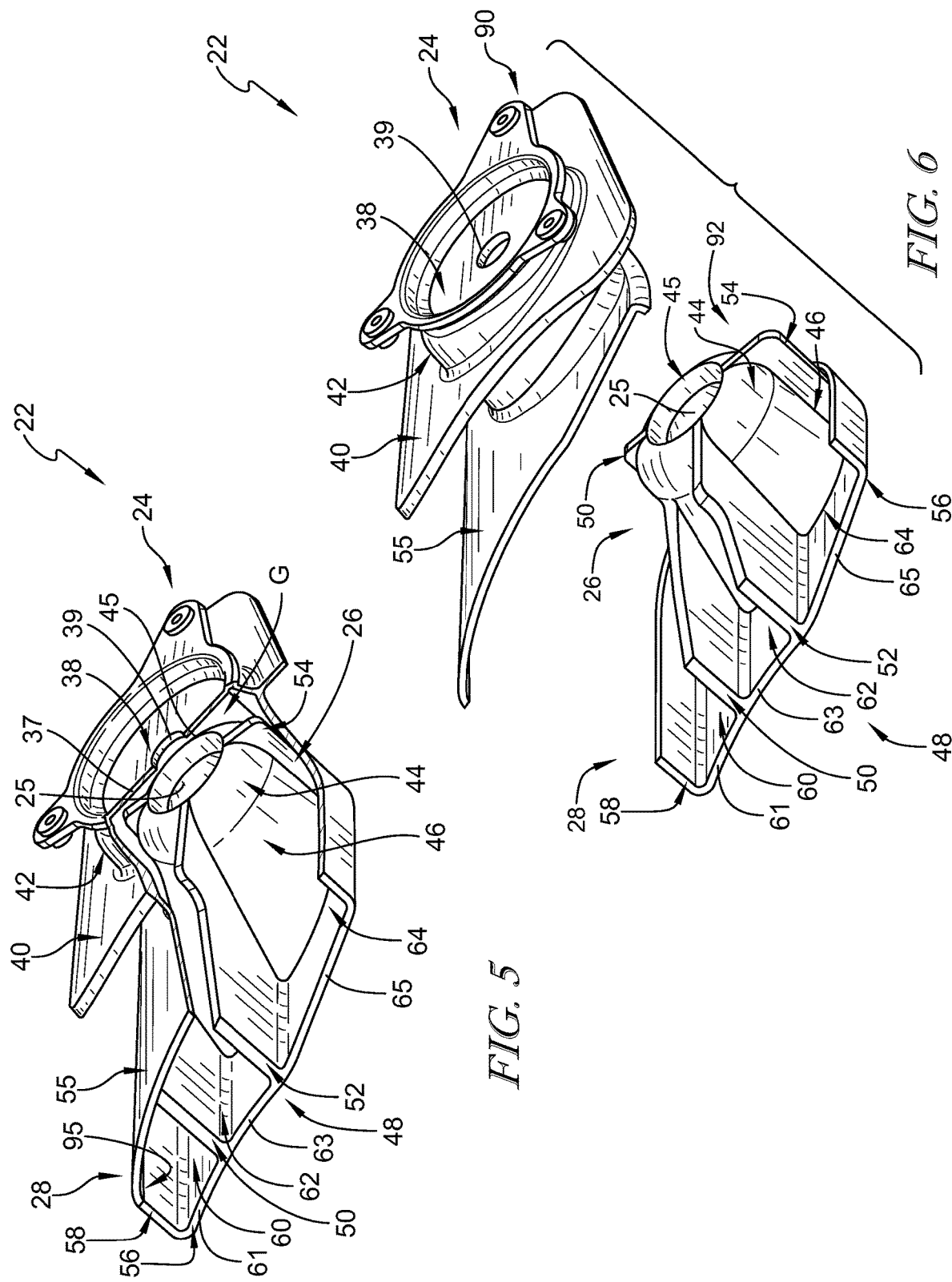

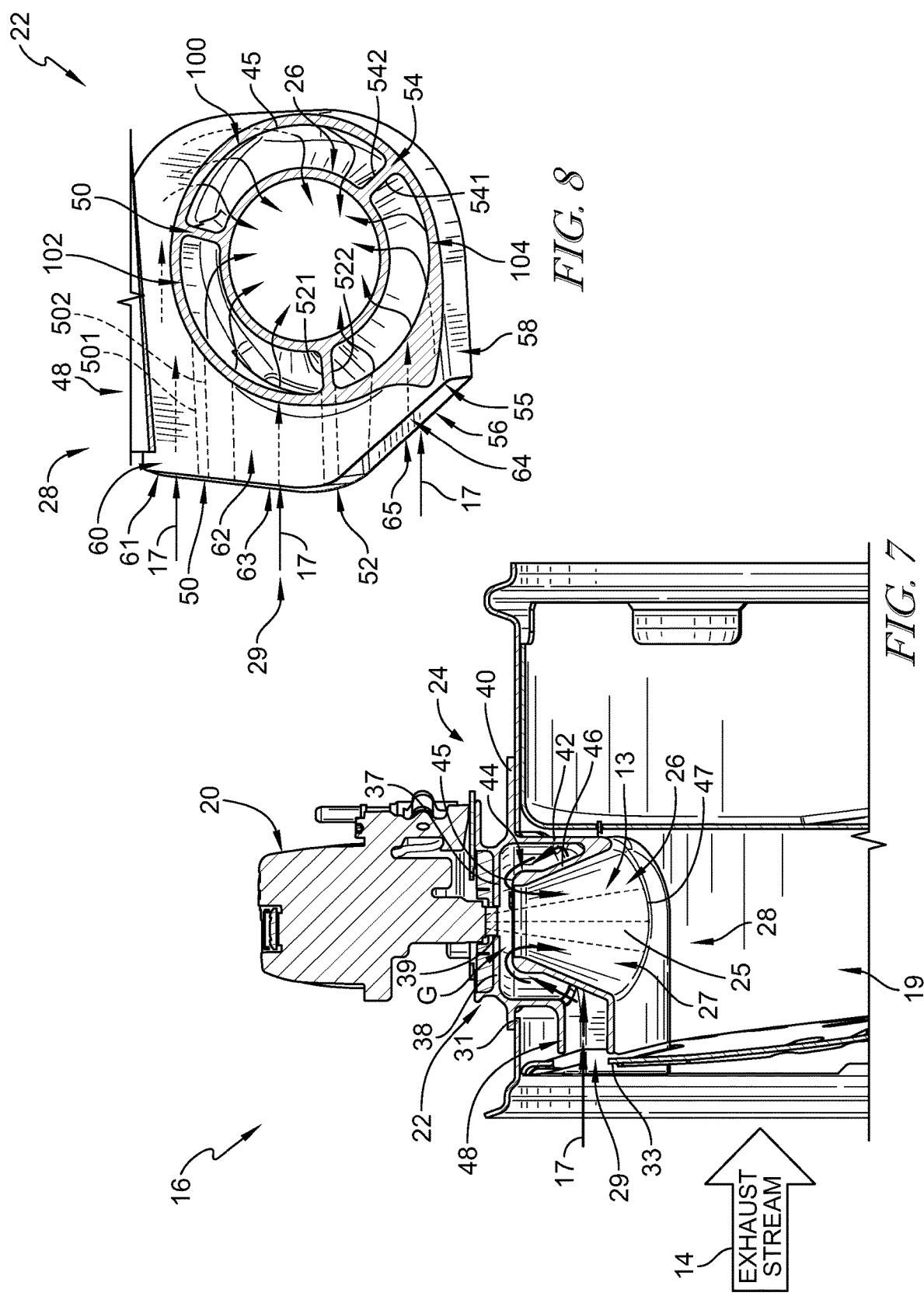

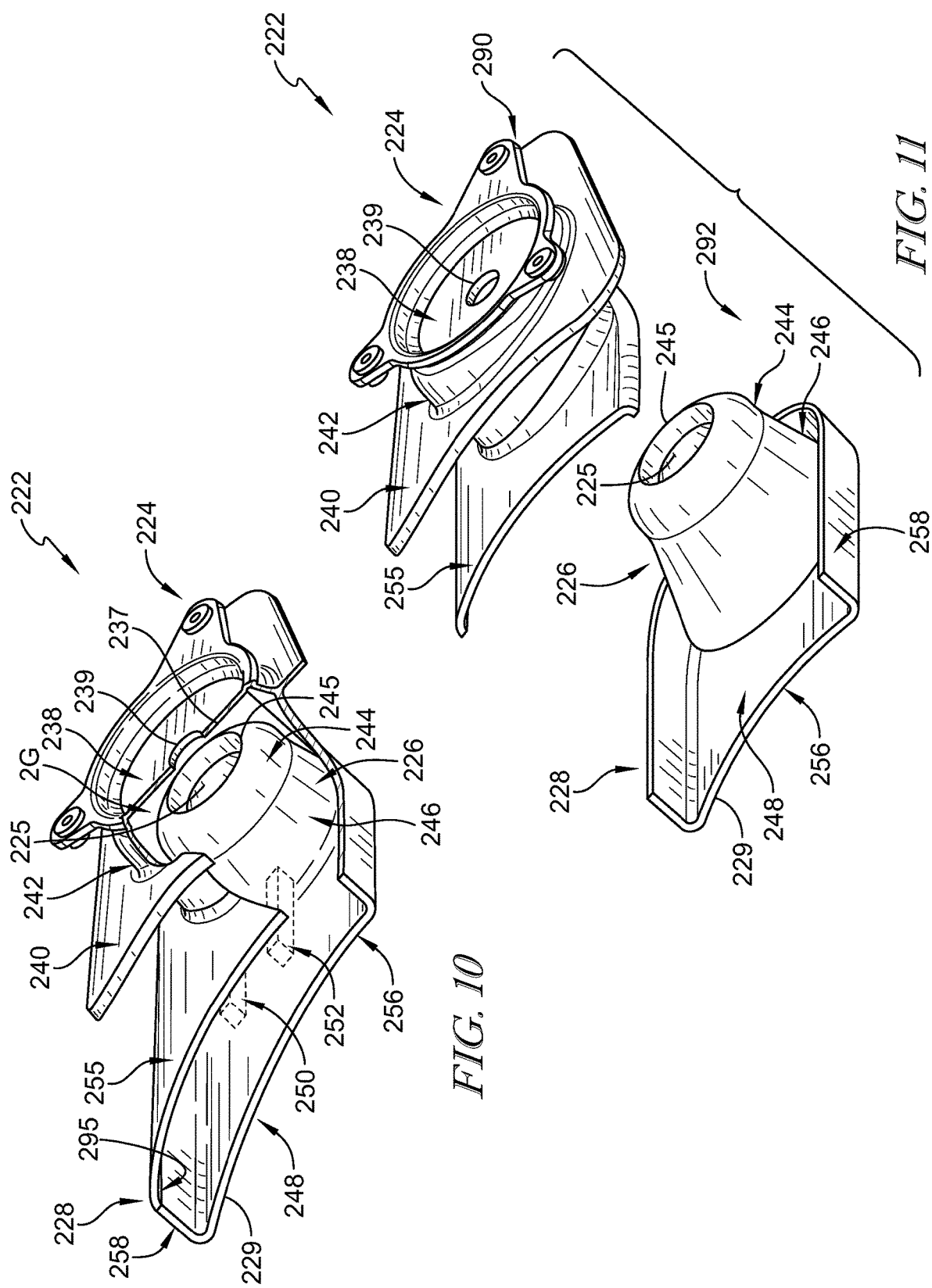

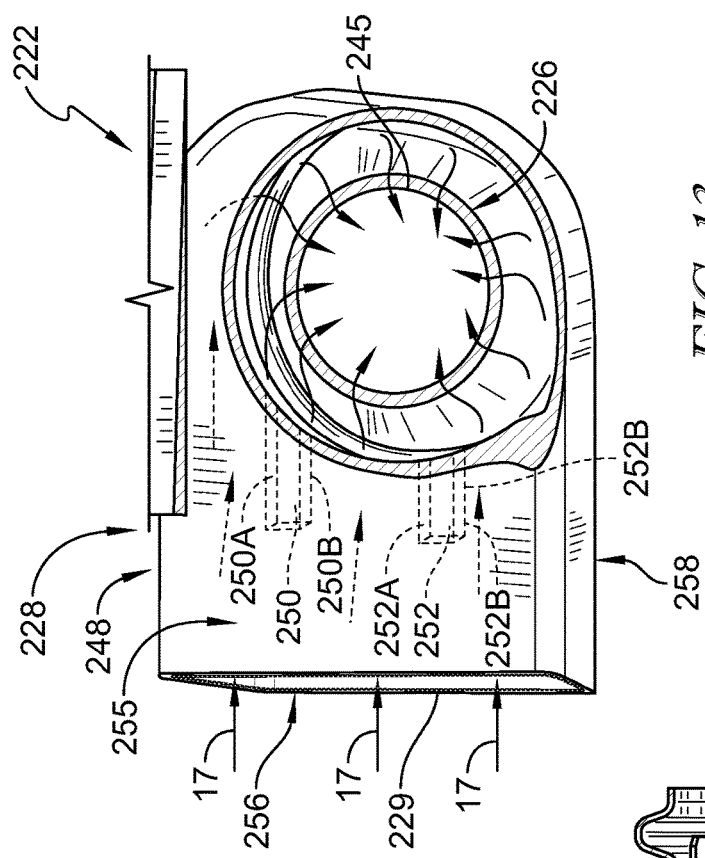
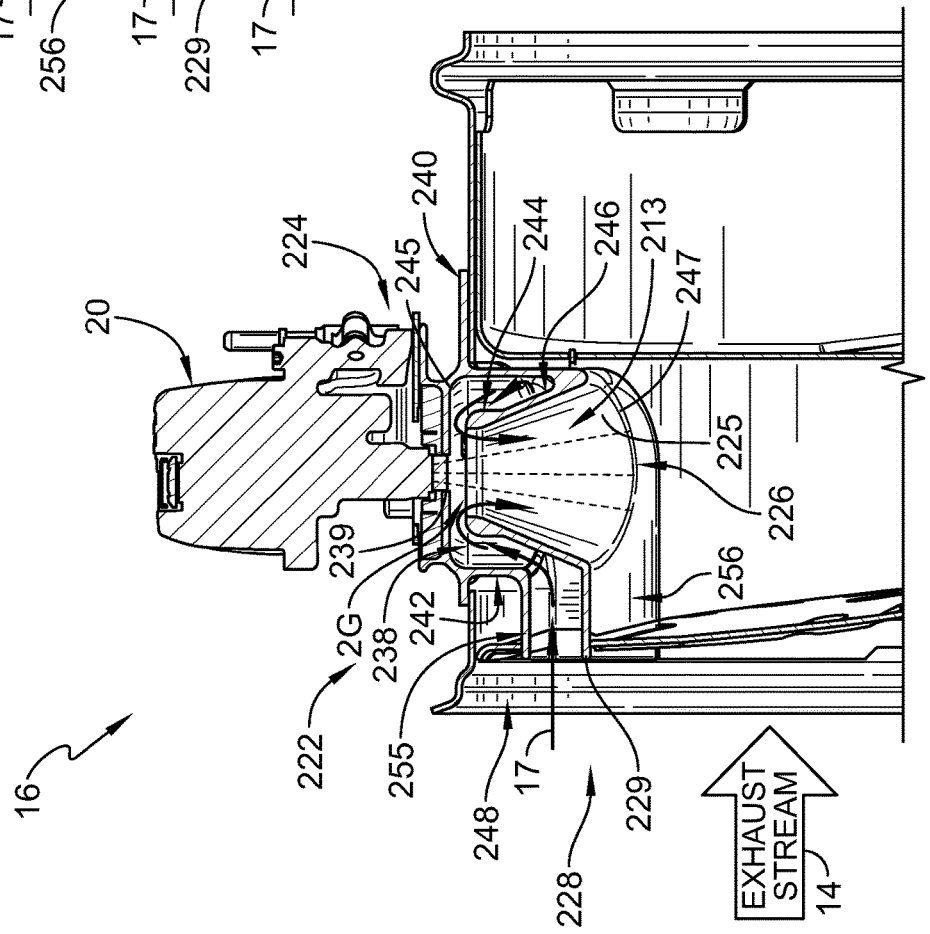

REDUCING AGENT MIXER

CROSS-REFERENCE TO RELATED APPLICATION

This application is a U.S. national counterpart application of international application serial No. PCT/US2016/058114, filed Oct. 21, 2016 the disclosure of which is incorporated by reference in its entirety.

BACKGROUND

The present disclosure relates to exhaust treatment systems for automotive applications, and particularly to mixing devices included in exhaust treatment systems. More particularly, the present disclosure relates to mixers for injecting reducing agents, such as urea solutions, into exhaust streams to induce a chemical reaction between the reducing agent and exhaust gasses to reduce Nitrous Oxides (NOx) in the exhaust gas.

SUMMARY

A reducing agent mixer adapted for inclusion in an exhaust treatment system is disclosed in this paper. The reducing agent mixer is configured to mix a reducing agent, for example a urea solution, with exhaust gas moving through the exhaust treatment system to cause a chemical reaction and reduce Nitrous Oxides (NOx) in the exhaust gas.

In illustrative embodiments, the reducing agent mixer includes a mixing can and a doser. The mixing can defines an internal space that houses the exhaust gas and reducing agent during mixing. The doser is mounted outside the mixing can and discharges predetermined amounts of reducing agent from a storage container associated with the exhaust treatment system into the mixing can.

In illustrative embodiments, the reducing agent mixer includes a reducing agent delivery device that holds the doser in position outside the mixing can and conducts the reducing agent from the doser through an injection cone into the internal space defined by the mixing can. The reducing agent delivery device uses exhaust gas to encourage distribution of reducing agent as it moves into the mixing can. Exhaust gas is also used by the reducing agent delivery device to block buildup of reducing agent on the injection cone that might hinder distribution of the reducing agent into the mixing can.

In illustrative embodiments, the reducing agent delivery device includes a doser attachment, the injection cone, and an exhaust guide. The doser attachment is coupled to the doser outside the mixing can and extends through an outer wall of the mixing can into the internal space. The injection cone is arranged inside the doser attachment and carries reducing agent from the doser and some exhaust gas into the internal space of the mixing can. The exhaust guide collects exhaust gas moving into the reducing agent mixer and distributes the exhaust gas around the injection cone before it enters the injection cone to be mixed with reducing agent. By distributing exhaust gas around the injection cone, exhaust gas enters the injection cone and lines an internal surface of the injection cone to block build up of reducing agent on an internal surface of the mixing cone.

In illustrative embodiments, the exhaust guide includes an exhaust-distribution duct that extends upstream from the injection cone and forms an exhaust-receipt opening. The exhaust-receipt opening faces in the upstream direction and is aligned with a single guide aperture formed in the mixing can. Accordingly exhaust moving through the guide aperture enters the exhaust-distribution duct to be carried around the inlet aperture of the injection cone.

In illustrative embodiments, the exhaust guide includes a plurality of flow distribution walls that divide the exhaust-distribution duct into a plurality of flow tubes. Each of the flow tubes is shaped to discharge exhaust gas at a different location around the inlet aperture of the injection cone. By discharging at different locations around the injection cone, exhaust gas is distributed around the inlet aperture of the injection cone.

In illustrative embodiments, the doser attachment includes a coupler flange outside the mixing can coupled to the doser, a mount cylinder that extends into the mixing can, and a port plate that extends over the mount cylinder. The injector cone includes an outer dome and a flared wall that extends from the outer dome away from the doser attachment. The port plate has a flat shape and is formed to include an injection port that the doser discharges reducing agent through. The outer dome of the injector cone has a dome shape and forms the inlet aperture aligned with the injector port to receive reducing agent moving through the port plate.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
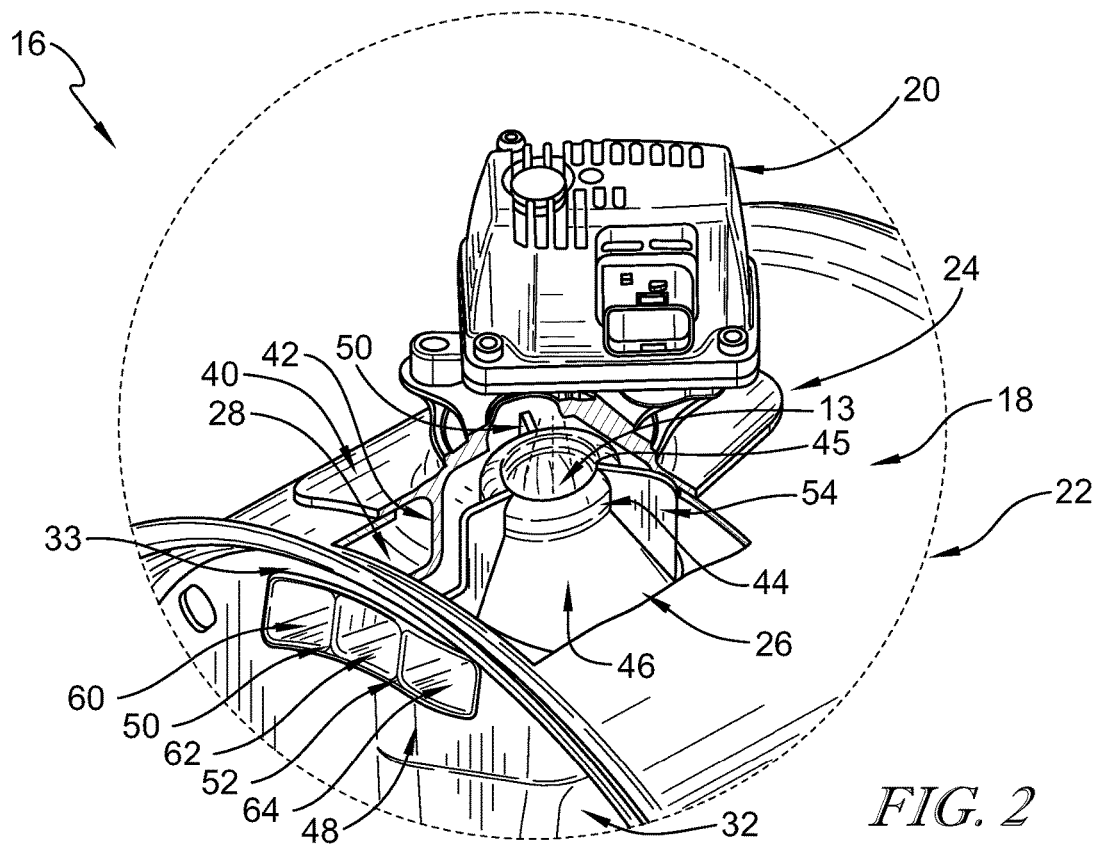
Figure 3:
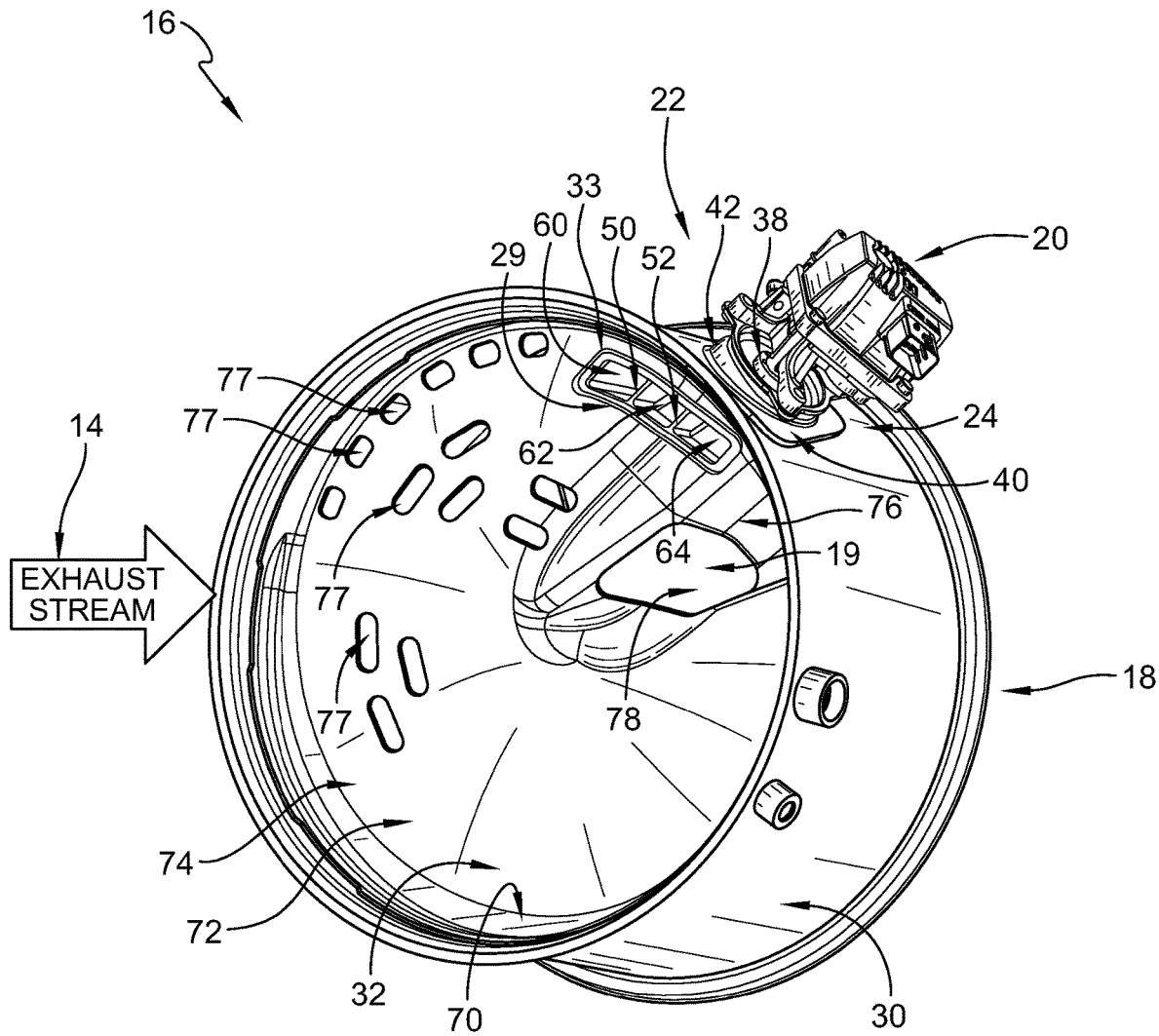
Figure 4:
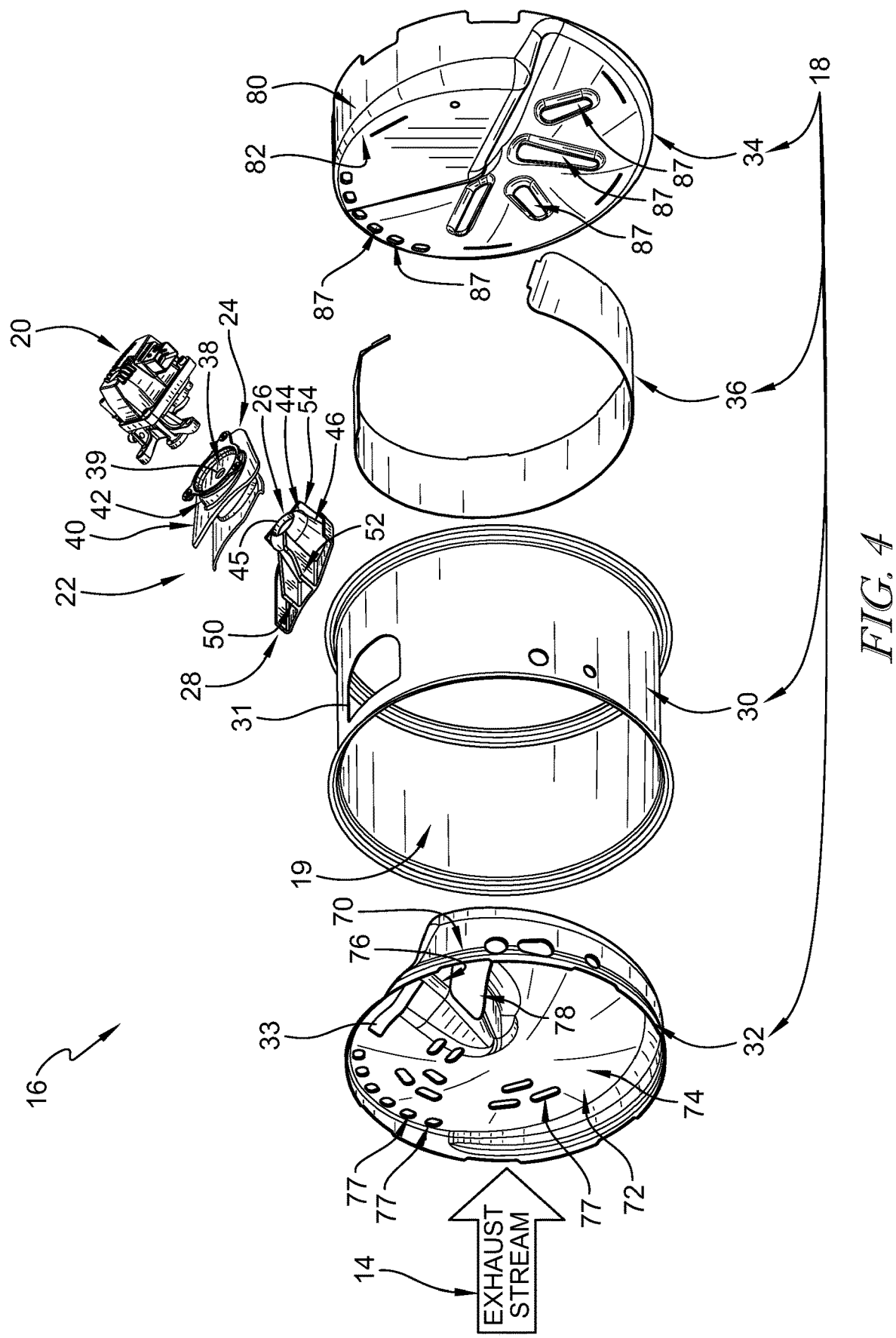
Figure 9:
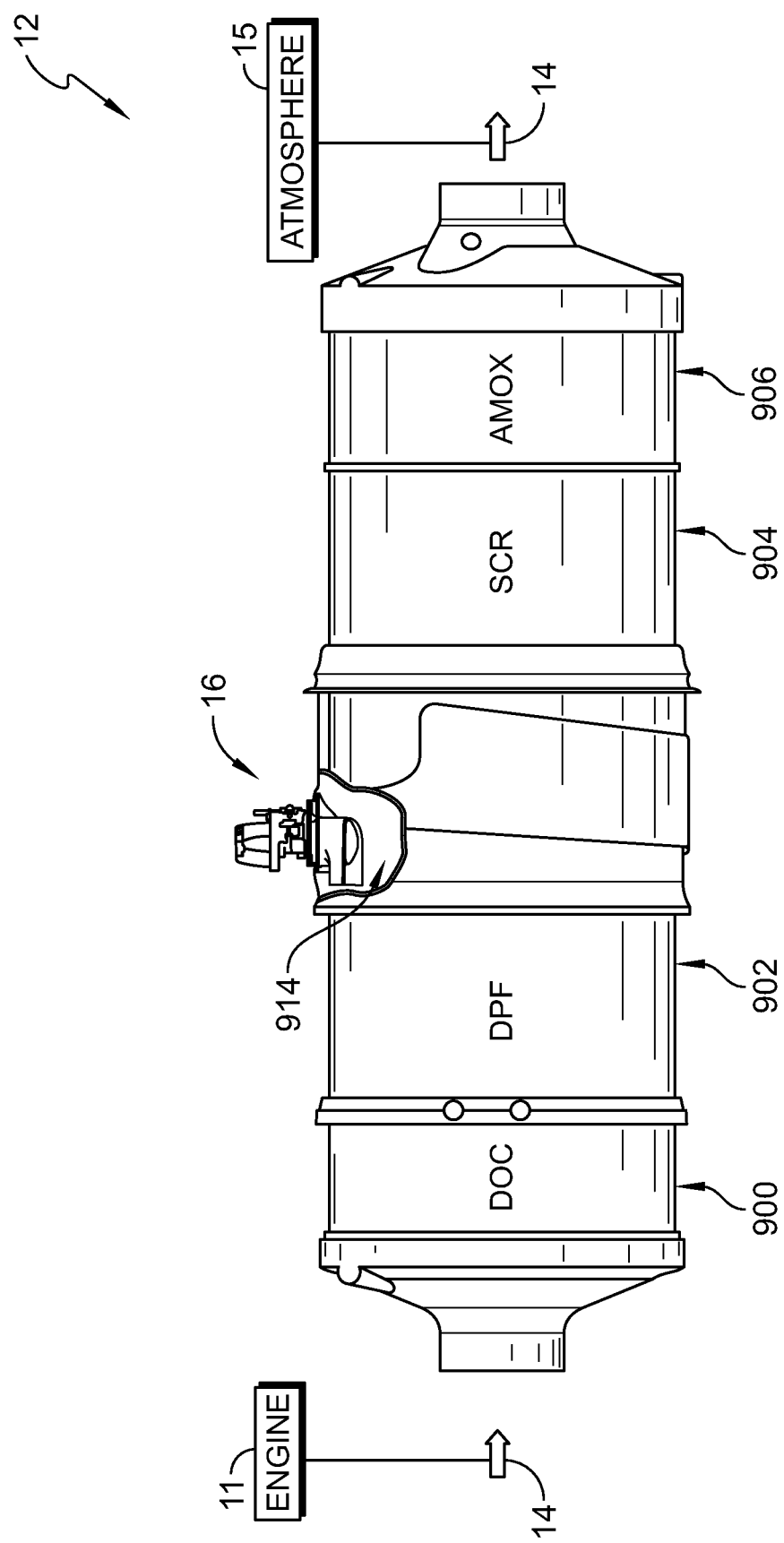

The detailed description particularly refers to the accompanying figures in which:

FIG. 1 is a perspective view showing a vehicle fitted with an exhaust treatment system for reducing various effluents such as $NO_x$ (nitrous oxides) and hydrocarbons in the exhaust stream before releasing the engine exhaust into the atmosphere, the exhaust treatment system includes a reducing agent mixer for injecting and mixing a reducing agent into the exhaust stream to induce a chemical reaction between the reducing agent and the exhaust in order to reduce nitrous oxide in the exhaust stream;

FIG. 2 is an enlarged perspective view of the reducing agent mixer from FIG. 1 showing that the reducing agent mixer includes a mixing can, a doser, and a reducing agent delivery device coupled to the mixing can and to the doser and showing that the reducing agent delivery device includes a doser attachment adapted to support the doser relative to the mixing can, an injection cone arranged to receive a reducing agent from the doser and conduct the reducing agent to the exhaust stream, and an exhaust guide configured to provide means for collecting a portion of the exhaust stream moving into the reducing agent mixer and distribute the exhaust gas around an inlet of the injection cone so that exhaust moving through the injection cone lines an internal surface of the injection cone and blocks buildup of reducing agent onto the internal surface of the injection cone;

FIG. 3 is a perspective view of the reducing agent mixer showing the doser supported external to the mixing can by the reducing agent delivery device and showing that the exhaust guide included in the reducing agent delivery device is arranged internal to the mixing can and opens in an upstream direction to receive exhaust moving into the reducing agent mixer;

FIG. 4 is an exploded perspective view of the reducing agent mixer including the mixing can, the doser, and the reducing agent delivery device and showing that the mixing can includes a cylindrical outer wall, an inlet baffle adapted to induce swirl on the exhaust stream moving into the mixing can, and an outlet baffle adapted to conduct exhaust gas mixed with reducing agent out of the mixing can, and an inner wall for spacing the inlet baffle from the outlet baffle and which is heated by the exhaust stream to maintain a higher temperature than the outer wall of the mixing can in order to prevent a buildup of reducing agent after the reducing agent impacts the inner wall and showing that the cylindrical wall of the mixing can is formed to include an aperture through which the reducing agent delivery device extends into the mixing can while the doser remains outside the mixing can;

FIG. 5 is an enlarged perspective view of the reducing agent delivery device cut away to show that the exhaust guide includes an exhaust distribution conduit and a plurality of flow distribution walls configured to provide means for collecting a portion of the exhaust stream moving into the reducing agent mixer and distributing the portion of the exhaust stream around an inlet of the injection cone so that exhaust moving through the injection cone lines an internal surface of the injection cone and blocks deposition of reducing agent being conducted by the injection cone;

FIG. 6 is an exploded perspective view of the reducing agent delivery device from FIG. 5 separated into two cast sections and showing that an outer section includes the doser attachment, a guide tube, and a conduit ceiling coupled to the guide tube, and an inner section includes the injection cone, a conduit floor, and the plurality of flow distribution walls coupled to the conduit floor, the outer and inner sections configured to mate to establish the exhaust distribution conduit;

FIG. 7 is an enlarged sectional view of a portion of the reducing agent mixer showing the exhaust distribution conduit included in the reducing agent delivery device and receiving a portion of the exhaust stream and directing the portion of the exhaust stream around and through the inlet of the injection cone included in the reducing agent delivery device so that exhaust moving through the injection cone lines the internal surface of the injection cone and blocks deposition of reducing agent being discharged by the doser;

FIG. 8 is an enlarged perspective view of the reducing agent delivery device cut away to show that the exhaust stream enters the exhaust distribution conduit and that the plurality of flow distribution walls separate the exhaust stream and direct each separated portion toward different locations around the inlet of the injection cone;

FIG. 9 is a perspective view of the reducing agent mixer assembled in the exhaust treatment system in FIG. 1 showing that the exhaust stream flows from the engine of the vehicle, through a diesel oxidation catalyst (DOC) and a diesel particulate filter (DPF) before reaching the reducing agent mixer where reducing agent is added to the exhaust stream and mixed to create a mixture of exhaust and reducing agent, the mixture then flows through a selective catalytic converter (SCR) and other catalyst devices such as an ammonia oxidation catalyst (AMOX) for reduction of nitrous oxides, hydrocarbons, and other impurities through chemical reactions between the mixture and the SCR and other catalytic devices before the exhaust stream is released into the atmosphere;

FIG. 10 is an enlarged perspective view of another reducing agent delivery device adapted for use in the reducing agent mixer of FIGS. 1-9, the reducing agent delivery device including an exhaust distribution conduit without flow distribution walls and showing that the exhaust distribution conduit may optionally include a plurality of flow distribution guides within the exhaust distribution conduit;

FIG. 11 is an exploded perspective view of FIG. 10 showing the reducing agent delivery device separated into the two cast sections adapted to be welded together;

FIG. 12 is a sectional view of the reducing agent delivery device in FIGS. 10-11 showing the exhaust distribution conduit extending through the inlet baffle of a mixer and the portion of the exhaust stream entering the exhaust distribution conduit being directed around the injector cone and through the inlet to the injector cone so that exhaust moving through the injection cone lines the internal surface of the injection cone and blocks deposition of reducing agent discharged by the doser; and FIG. 13 is an enlarged perspective view of the reducing agent delivery device cut away to show that the exhaust stream enters the exhaust distribution conduit and showing that the exhaust guide may include flow distribution guides within the exhaust distribution conduit to help distribute the portion of the exhaust stream evenly around the inlet of the injection cone.

DETAILED DESCRIPTION

A reducing agent mixer 16 included in an exhaust treatment system 12 for a vehicle 10 is shown in FIGS. 1-4. Reducing agent mixer 16 mixes a reducing agent (illustratively a urea solution) with exhaust gas moving through the reducing agent mixer so that the reducing agent chemically reacts with the exhaust gas and reduces undesired Nitrous Oxides (NOx) produced when fuel is burned. Reducing agent mixer 16 includes a mixing can 18 into which exhaust gasses flow and a doser 20 that injects predetermined amounts of reducing agent into mixing can 18.

Reducing agent delivery devices 22, 222, shown in FIGS. 5 and 10, are adapted to be included in reducing agent mixer 16. Reducing agent delivery devices 22, 222 conduct reducing agent 13 from doser 20 into mixing can 18 through injection cones 26, 226 using exhaust gas 14 to encourage entry and distribution of reducing agent as shown in FIGS. 7 and 12. Exhaust gas 14 is also used by reducing agent delivery devices 22, 222 to line an interior surface 25, 225 of injection cones 26, 226 blocking buildup of reducing agent 13 on injection cones 26, 226 that might hinder distribution of reducing agent as it moves into mixing can 18.

Each reducing agent delivery devices 22, 222 includes an integrated exhaust guide 28, 228 that receives and distributes exhaust gas 14 around injection cones 26, 226 as shown in FIGS. 8 and 13. Exhaust guide 28, shown in FIGS. 5-7, includes an exhaust-distribution duct 48 and flow-distribution walls 50, 52, and 54 that divide exhaust-distribution duct 48 into multiple flow tubes 60, 62, 64. Each flow tube 60, 62, 64 delivers exhaust to different locations around injection cone 26 as suggested in FIG. 8. Exhaust guide 228, shown in FIGS. 10-12, includes an undivided exhaust-distribution duct 248. Exhaust guide 228 is shaped to deliver exhaust around injection cone 226 as suggested in FIG. 13. Exhaust guide 228 may include flow-distribution directors 250 and 252 (shown in phantom) that encourage flow to be distributed to different locations around injection cone 226.

Vehicle 10 includes an engine 11 an exhaust treatment system 12 as shown, for example, in FIG. 1. Engine 11 is, illustratively, an internal combustion engine configured to combust fuel and discharge an exhaust stream 14. Exhaust treatment system 12 receives exhaust stream 14 produced by vehicle 10 and is configured to reduce various effluents before exhaust stream 14 is released to atmosphere 15. Exhaust treatment system 12 includes a reducing agent mixer 16 for injecting and mixing a reducing agent 13, illustratively a urea solution, into exhaust stream 14 as shown in FIG. 2. Chemical reaction of reducing agent 13 with exhaust stream 14 reduces $NO_x$ in exhaust stream 14.

Reducing agent mixer 16 includes a mixing can 18, a doser 20, and a reducing agent delivery device 22 as shown in FIG. 2. Mixing can 18 provides an internal space 19 for mixing reducing agent 13 with exhaust stream 14 allowing chemical reactin of exhaust stream 14 with reducing agent 13 to reduce $NO_x$ in exhaust stream 14 as shown in FIG. 3. Doser 20 injects reducing agent 13 into internal space 19 in a controlled fashion to achieve a desired reaction with exhaust stream 14. Reducing agent delivery device 22 supports doser 20 outside mixing can 18 and conducts reducing agent 13 into internal space 19 of mixing can 18. Reducing agent delivery device 22 is shaped to utilize exhaust stream 14 to distribute reducing agent 13 in internal space 19 of mixing can 18 and to block deposition or buildup of reducing agent 13 on components of reducing agent delivery device 22 as suggested in FIG. 7.

Mixing can 18 extends along a central axis 18A and is configured to induce a swirling motion onto exhaust stream 14 moving into reducing agent mixer 16. Mixing can 18 includes an outer wall 30, an upstream baffle 32, a downstream baffle 34, and an inner wall 36 within outer wall 30 and between upstream baffle 32 and downstream baffle 34 as shown in FIG. 4. Outer wall 30 is formed to include a can aperture 31 to allow reducing agent delivery device 22 to extend into internal space 19 while doser 20 remains outside of mixing can 18. Upstream baffle 32 is shaped to induce a swirl into exhaust stream 14 and includes a guide aperture 33 through which reducing agent delivery device 22 receives a portion of exhaust stream 14 as shown in FIG. 3. Downstream baffle 34 conducts mixed exhaust stream 14 and reducing agent 13 out of reducing agent mixer 16 into other components of exhaust treatment system 12 as shown in FIG. 9. Inner wall 36 lies within outer wall 30 and is configured to separate upstream baffle 32 and downstream baffle 34 to establish internal space 19. Inner wall 36 is also configured to be heated by exhaust stream 14 to maintain a higher temperature than outer wall 30 of mixing can 18 in order to prevent a buildup of reducing agent 13 on inner wall 36 within internal space 19 after reducing agent 13 is injected into internal space 19.

Upstream baffle 32 provides an inlet for exhaust stream 14 as it moves into internal space 19 defined by mixing can 18 as suggested in FIGS. 3 and 4. Upstream baffle 32 includes a rim 70 and a panel 72 as shown in FIG. 4. Rim 70 extends from panel 72 along a portion of outer wall 30 included in mixing can 18 and provides means for coupling upstream baffle 32 to outer wall 30. Panel 72 closes an upstream end of outer wall 30 and is formed to include openings to admit exhaust stream 14 into internal space 19 of mixing can 18.

Panel 72 is illustratively contoured and includes a first section 74 arranged to extend in a plane generally perpendicular to central axis 18A and a second section 76 arranged to extend in a plane generally parallel to central axis 18A as shown in FIG. 3. First section 74 is formed to include exhaust inlet apertures 77 in various locations and at least a portion of first section 74 is contoured into a helical shape to induce swirl into exhaust stream 14. Second section 76 is formed to include a swirl aperture 78 generally parallel to central axis 18A that allows exhaust stream 14 to enter internal space 19 moving circumferentially around central axis 18 to induce swirl into exhaust stream 14. Guide aperture 33 through which exhaust gas flows into reducing agent deliver device 22 is formed through portions of both first section 74 and the second section 76 of panel 72 included in upstream baffle 32 as shown in FIGS. 3 and 4.

Downstream baffle 34 provides an outlet for exhaust stream 14 as it moves out of internal space 19 defined by mixing can 18 as suggested in FIG. 4. Downstream baffle 34 includes a rim 80 and a panel 82 as shown in FIG. 4. Rim 80 extends from panel 82 along a portion of outer wall 30 included in mixing can 18 and provides means for coupling downstream baffle 34 to outer wall 30. Panel 82 closes a downstream end of outer wall 30 and is formed to include openings 87 to discharge exhaust stream 14 from internal space 19 of mixing can 18.

Doser 20 injects reducing agent 13 into mixing can 18 in amounts designed to cause desired chemical reactions with exhaust stream 14. Doser 20 is electronically controlled and can adjust the amount of reducing agent injected based on parameters associated with engine 11, exhaust stream 14, and other suitable factors.

Reducing agent delivery device 22 is coupled to outer wall 30 of mixing can 18 and conducts reducing agent 13 from doser 20 into mixing can 18 as shown in FIG. 3. Reducing agent delivery device 22 includes a doser attachment 24, an injection cone 26, and an exhaust guide 28 as shown in FIG. 5. Doser attachment 24 closes aperture 31 in outer wall 30 of mixing can 18 and fixes doser 20 in place relative to mixing can 18 as shown in FIG. 7. Injection cone 26 is arranged to receive reducing agent 13 from doser 20 and a portion of exhaust stream 14 from exhaust guide 28 to distribute reducing agent 13 in mixing can 18. Exhaust guide 28 is arranged to receive a portion 17 of exhaust stream 14 from upstream of injection cone 26 and direct portion 17 of exhaust stream 14 into injection cone 26 *a* as shown in FIG. 7. Portion 17 of exhaust stream 14 blocks the deposition or buildup of reducing agent on injector cone 26.

Doser attachment 24 supports doser 20 relative to mixing can 18 and provides an injection port 39 so that reducing agent 13 discharged by doser 20 is carried through doser attachment 24 and can aperture 31 into mixing can 18 as shown in FIG. 7. Doser attachment 24 includes a mount cap 38, a closure flange 40, and a mount cylinder 42 as shown in FIG. 5. Mount cap 38 couples to doser 20 via fasteners (not shown) and forms an injection port 39 so that doser 20 can inject reducing agent 13 into internal space 19. Closure flange 40 rests against outer wall 30 of mixing can 18 to close can aperture 31 when reducing agent delivery device 22 is assembled within reducing mixer 18. Mount cylinder 42 extends from mount cap 38, through closure flange 40 and can aperture 31 into mixing can 18 as shown in FIG. 7.

Injection cone 26 facilitates distribution of reducing agent 13 as it moves into internal space 19 of mixing can 18 by conducting reducing agent 13 through an expanding distribution channel 27 defined by injection cone 26 as shown in FIG. 7. Injection cone 26 is spaced apart from mount cap 38 of reducing agent delivery device 22 and is encircled by mount cylinder 42 of reducing agent delivery device 22 to create a gap G supplied with exhaust stream 14 by exhaust guide 28 as shown in FIG. 7. Injection cone 26 includes an outer dome 44 and a flared wall 46 that extends from outer dome 44 as shown in FIG. 5. Outer dome 44 has a dome shape and is formed to include an inlet aperture 45. Inlet aperture 45 is aligned with injection port 39 to receive reducing agent 13 and is surrounded by gap G to receive portion 17 of exhaust stream 14 as shown in FIG. 7. Flared wall 46 has a hollow, frustoconical shape that flares outward as it extends from outer dome 44. Flared wall 46 defines an outlet aperture 47 though which reducing agent 13 and portion 17 of exhaust stream 14 exit expanding mixing channel 27 into internal space 19 of mixing can 18 as shown in FIG. 7.

Exhaust guide 28 receives exhaust and distributes it around injection cone 26 as shown in FIG. 7. Exhaust guide 28 includes an exhaust-distribution duct 48 and flow-distribution walls 50, 52, and 54 as shown in FIGS. 5 and 8. Exhaust-distribution duct 48 forms an exhaust-receipt opening 29 arranged to open toward upstream baffle 32 so that portion 17 of exhaust stream 14 flows into exhaust receipt opening 29 as shown in FIG. 7. In one embodiment, exhaust receipt opening 29 is spaced apart from and aligns with guide aperture 33 formed in upstream baffle 32 downstream of upstream baffle 32 as shown in FIG. 7. In another embodiment, exhaust-receipt opening 29 extends through guide aperture 33 and is upstream of upstream baffle 32 as shown in FIG. 12. Flow-distribution walls 50, 52, and 54 separate exhaust-receipt opening 29 of exhaust-distribution duct 48 into flow ports 61, 63, and 65 and distribute exhaust around injection cone 26 as shown in FIG. 8.

Flow ports 61, 63, and 65 are configures to provide ingress means for admitting all exhaust that moves into reducing agent delivery device 22 to be discharged out of injection cone 26. In the illustrative embodiment, during operation, all exhaust flow into reducing agent delivery device 22 is discharged out of injection cone 26 and flow ports 61, 63, and 65 are only inlets for exhaust.

Exhaust-distribution duct 48 includes a ceiling 55, a floor 56, and a side wall 58 as shown in FIG. 5. Ceiling 55 is coupled to mount cylinder 42 and forms an upper boundary for exhaust-distribution duct 48. Floor 56 is coupled to ceiling 55 and flared wall 46 of injection cone 26 to form outlet aperture 47. Side wall 56 is substantially u-shaped and extends from exhaust-receipt opening 29, around injection cone 26, and couples ceiling 55 to floor 56 to form exhaust-distribution duct 48 as shown in FIG. 8.

Flow distribution walls 50, 52, and 54 extend from floor 56 to inlet opening 45 of injection cone 26 as shown in FIG. 5. Flow distribution walls 50, 52, and 54 also extend from inlet opening 45 to mount cylinder 42 within gap G. In this way, flow distribution walls 50, 52, and 54 separate exhaust-distribution duct 48 into a first flow tube 60, a second flow tube 62, and a third flow tube 64 as shown in FIGS. 5 and 8. Flow distribution walls 50, 52, and 54 are spaced circumferentially around inlet opening 45 of inlet dome 44 about 120 degrees from each other so that each flow tube 60, 62, and 64 provides exhaust to a different location around injection cone 16. However, it is within the scope of this disclosure to vary the spacing between each individual flow distribution wall 50, 52, and 54.

Flow distribution wall 50 separates flow tubes 60 and 62 and includes sides 501 and 502 that face in opposite directions within exhaust-distribution duct 48 as shown in FIG. 8. Flow distribution wall 52 separates flow tubes 62 and 64 and includes sides 521 and 522 that face in opposite directions within exhaust-distribution duct 48. Flow distribution wall 54 separates flow tubes 60 and 64 and includes sides 541 and 542 that face in opposite directions within exhaust-distribution duct 48. Sides 502 and 521 face towards one another within exhaust-distribution duct 48. Sides 501 and 522 face toward side wall 58 within exhaust distribution conduit 48.

Mount cap 38 includes a flat surface 37 that forms the upper boundary of gap G and is spaced apart from injection cone 26 to define gap G therebetween. Flat surface 37 of mount cap 38 is arranged perpendicular to a central axis 42A of mount cylinder 42 and parallel to a plane defined by inlet aperture 45. Flow tubes 60, 62, 64, injection cone 26, mount cap 38, and mount cylinder 42 cooperate to direct exhaust toward inlet aperture 45 of injector cone 26 as shown in FIG. 7. Flow tubes 60, 62, and 64 conduct exhaust toward injection cone 26. Outer dome 44 of injector cone 26 and mount cylinder 42 direct exhaust toward flat surface 37 while flat surface 37 directs exhaust toward inlet aperture 45. At the same time, doser 20 injects reducing agent 13 into reducing agent delivery device 22 through injection port 39 and toward inlet aperture 45. Exhaust is consolidated within gap G from flow tubes 60, 62, and 64 and combined with the injected reducing agent 13. Both reducing agent 13 and exhaust are then forced into inlet aperture 45 of injection cone 26 at a substantially even distribution, blocking buildup or deposition of reducing agent 13 along injection cone 26.

As exhaust enters flow port 61, it is confined within flow tube 60 by ceiling 55, floor 56, side wall 58 and side 501 as shown in FIG. 8. Flow tube 60 then directs portion 17 circumferentially around injection cone 26 where exhaust is then blocked by side 542 of flow distribution wall 54. Exhaust is then directed along injection cone 26 and enters inlet opening 45 through a first vent 100 formed in inlet opening 45 as shown in FIG. 8.

As exhaust enters flow port 63, it is confined within flow tube 62 by ceiling 55, floor 56, and sides 502 and 521 as shown in FIG. 8. Flow tube 62 then directs exhaust along injection cone 26 and into inlet opening 45 through a second vent 102 formed in inlet opening 45 as shown in FIG. 8.

As exhaust enters flow port 65, it is confined within flow tube 64 by ceiling 55, floor 56, side wall 58 and side 522 as shown in FIG. 8. Flow tube 64 then directs exhaust circumferentially around injection cone 26 where exhaust is then blocked by side 541 of flow distribution wall 54. Exhaust is then directed along injection cone 26 and enters inlet opening 45 through a third vent 104 formed in inlet opening 45 as shown in FIG. 8.

In one embodiment, reducing agent delivery device 22 is separated into a first cast section 90 and a second cast section 92 as shown, for example, in FIG. 6. First cast section 90 includes doser attachment 24 and ceiling 55 of exhaust guide 28. Second cast section 92 includes injector cone 26 and floor 56 and side wall 58 of exhaust guide 28. Second cast section 92 also forms flow distribution walls 50, 52, 54. First cast section 90 and second cast section 92 are bonded together to form agent deliver device 22. In other embodiments, reducing agent delivery device 22 may be a monolithic cast component in which all features are integrally formed with one another as suggested in FIG. 5. In other embodiments, reducing agent delivery device 22 may be a multi-piece assembly.

In illustrative embodiments, a weld 95 bonds first cast section 90 and second cast section 92. In other embodiments other bonding features or fasteners may couple first cast section 90 and second cast section 92. Separating reducing agent delivery device 22 into first and second cast sections 90, 92 facilitates casting of internal features.

As shown in FIG. 9, reducing agent mixer 16 is adapted to fit within exhaust treatment system 12. Exhaust treatment system 12 illustratively includes a diesel oxidation catalyst 900 (DOC), a diesel particulate filter 902 (DPF), a selective catalytic converter 904 (SCR), and other catalyst devices such as an ammonia oxidation catalyst 906 (AMOX) in addition to reducing agent mixer 16.

In operation, exhaust stream 14 flows from engine 11 of vehicle 10 (not shown) through diesel oxidation catalyst 900

(DOC) and diesel particulate filter 902 (DPF). Exhaust stream 14 then flows to reducing agent mixer 16 where doser 20 injects reducing agent 13 into reducing agent delivery device 22 to be added to exhaust stream 14 and mixed to create a mixture 914 of exhaust stream 14 and reducing agent 13. Mixture 914 then flows through selective catalytic converter 904 (SCR) and ammonia oxidation catalyst 906 (AMOX) for reduction of nitrous oxides, hydrocarbons, and other impurities through chemical reactions. Exhaust stream 14 is then released into atmosphere 15.

In a second embodiment, shown in FIG. 10, a reducing agent delivery device 222 is similar to reducing agent delivery device 22 from FIG. 5. Reducing agent delivery device 222 includes a doser attachment 224, an injection cone 226, and an exhaust guide 228.

Doser attachment 224 closes aperture 31 in outer wall 30 of mixing can 18 and fixes doser 20 in place relative to mixing can 18 as shown in FIG. 12. Doser attachment 224 includes a mount cap 238 that forms an injection port 239, a closure flange 240 that rest along mixing can 18 when reducing agent delivery device 222 is assembled within mixing can 18, and a mount cylinder 242 attached to closure flange 240 and extends from mount cap 238 through mixing can 18 as shown in FIG. 12.

Injection cone 226 is arranged to receive reducing agent 213 from doser 20 and a portion 17 of exhaust stream 14 from exhaust guide 228 to distribute reducing agent 213 in mixing can 18 as shown in FIG. 12. Injection cone 226 includes an outer dome 244 formed to include an inlet aperture 245 and a flared wall 246 that extends from outer dome 244 and is formed to include an outlet aperture 247 as shown in FIG. 12.

Exhaust guide 228 includes an exhaust-distribution duct 248 that is arranged to face upstream and receive a portion 17 of exhaust stream 14 through an exhaust-receipt opening 229 as shown in FIG. 12. Exhaust-distribution duct 248 and mount cylinder 242 form a gap 2G that surrounds injection cone 226 and allow distribution of exhaust around injection cone 226 and into injection aperture 245. Exhaust guide 228 also includes a plurality of optional flow-distribution walls 250 and 252 indicated by dashed lines in FIGS. 10 and 13. Flow-distributions walls 250 and 252 separate exhaust-distribution duct 248 so that portion 17 of exhaust stream 14 is distributed around injection cone 26 as shown in FIG. 13.

Exhaust-distribution duct 248 includes a ceiling 255, a floor 256, and a side wall 258 as shown in FIG. 10. Ceiling 255 is coupled to mount cylinder 242 and forms an upper boundary for exhaust-distribution duct 248. Floor 256 is coupled to ceiling 255 and flared wall 246 of injection cone 226 to form outlet aperture 247. Side wall 258 is substantially u-shaped and extends from exhaust-receipt opening 229, around injection cone 226, and couples ceiling 255 to floor 256 to form exhaust-distribution duct 248 as shown in FIG. 13.

Optional flow-distribution directors 250 and 252 extend from injection cone 226 along floor 256 to a point within exhaust-distribution duct 248 to encourage flow to be distributed to different locations around injection cone 226 as suggested in FIG. 10. Flow distribution directors 250 and 252 do not extend all the way to exhaust-receipt opening 229. In some embodiments, other suitable flow directors such as bumps, troughs, and surface discontinuities may be included to encourage flow to be distributed to different locations around injection cone 226.

In one embodiment, reducing agent delivery device 222 is separated into a first cast section 290 and a second cast section 292 as shown, for example, in FIG. 11. First cast section 290 includes doser attachment 224 and ceiling 255 of exhaust guide 228. Second cast section 292 includes injector cone 226 and floor 256 and side wall 258 of exhaust guide 228. Second cast section 292 also includes optional flow distribution directors 250, 252. First cast section 290 and second cast section 292 are bonded together to form agent deliver device 222. In other embodiments, reducing agent delivery device 222 may be a monolithic cast component in which all features are integrally formed with one another as suggested in FIG. 10. In other embodiments, reducing agent delivery device 222 may be a multi-piece assembly.

In illustrative embodiments, a weld 295 bonds first cast section 290 and second cast section 292. In other embodiments other bonding features or fasteners may couple first cast section 290 and second cast section 292. Separating reducing agent delivery device 222 into first and second cast sections 290, 292 facilitates casting of internal features.

The following numbered clauses include embodiments that are contemplated and non-limiting:

Clause 1: A reducing agent mixer adapted for use in an exhaust treatment system associated with an internal combustion engine, the reducing agent mixer comprising a mixing can arranged around a central axis and shaped to define an internal space, the internal space adapted to house mixing of exhaust gas and reducing agent when exhaust gas moves along the central axis in a downstream direction through the reducing agent mixer, a doser mounted outside the mixing can and configured to discharge predetermined amounts of reducing agent into the internal space of the mixing can, and a reducing agent delivery device including a doser attachment that supports the doser outside the internal space of the mixing can, an injection cone that conducts reducing agent discharged from the doser into the internal space of the mixing can, and an exhaust guide configured to provide means for collecting exhaust gas moving into the reducing agent mixer and for distributing the exhaust gas around an inlet aperture of the injection cone so that exhaust gas moving through the injection cone lines an internal surface of the injection cone and blocks deposition of reducing agent onto an internal surface of the mixing cone.

Clause 2: The reducing agent mixer of any other suitable clause, combination of clauses, or combination of clause limitations, wherein the mixing can includes an outer wall formed to include a can aperture through which the reducing agent delivery device extends, an upstream baffle that defines an upstream side of the internal space and formed to include guide aperture, and a downstream baffle that defines a downstream side of the internal space, the exhaust guide includes an exhaust-distribution duct that extends in the upstream direction from the injection cone and forms an exhaust-receipt opening that opens facing in the upstream direction and that is aligned with the guide aperture so that exhaust moving through the guide aperture enters the exhaust guide for distribution around the inlet aperture of the injection cone when exhaust gas flows through the reducing agent mixer.

Clause 3: The reducing agent mixer of any other suitable clause, combination of clauses, or combination of clause limitations, wherein exhaust guide includes a plurality of flow distribution walls that divide the exhaust-distribution duct into a plurality of flow tubes and each of the flow tubes is shaped to discharge exhaust gas at a different location around the injection cone so that exhaust gas is distributed around the inlet aperture of the injection cone when exhaust gas flows through the reducing agent mixer.

Clause 4: The reducing agent mixer of any other suitable clause, combination of clauses, or combination of clause limitations, wherein the exhaust-distribution duct terminates downstream of the guide aperture formed in the upstream baffle such that the reducing agent delivery device is spaced apart from the upstream baffle and some exhaust gas moving through the guide aperture does not enter the exhaust-distribution duct when exhaust gas flows through the reducing agent mixer.

Clause 5: The reducing agent mixer of any other suitable clause, combination of clauses, or combination of clause limitations, wherein the exhaust-distribution duct extends through guide aperture of the upstream baffle and terminates upstream of the guide aperture.

Clause 6: The reducing agent mixer of any other suitable clause, combination of clauses, or combination of clause limitations, wherein the plurality of flow distribution walls divide the exhaust receipt opening into a plurality of flow ports each aligned with the guide aperture formed in the upstream baffle so that exhaust moving through the guide aperture enters the exhaust guide for distribution around the inlet aperture of the injection cone when exhaust gas flows through the reducing agent mixer.

Clause 7: The reducing agent mixer of any other suitable clause, combination of clauses, or combination of clause limitations, wherein the upstream baffle includes a first section arranged to extend in a plane generally perpendicular to the central axis and a second section arranged to extend in a plane generally parallel to the central axis, and the guide aperture formed in the upstream baffle is formed through portions of both the first section and the second section of the upstream baffle.

Clause 8: The reducing agent mixer of any other suitable clause, combination of clauses, or combination of clause limitations, wherein the doser attachment of the reducing agent delivery device includes a mount cap outside the mixing can that is coupled to the doser and a mount cylinder that extends through the can aperture formed in the outer wall of the mixing can, the mount cylinder encircling at least a portion of the injection cone to define a gap therebetween, and the gap is in fluid communication with the exhaust guide.

Clause 9: The reducing agent mixer of any other suitable clause, combination of clauses, or combination of clause limitations, wherein the mount cap includes a coupler flange configured to be coupled to the doser by fasteners and a port plate that extends over the mount cylinder outside the mixing can to close an outer end of the mount cylinder, the port plate formed to include an injection port aligned with the inlet aperture of the injection cone to allow reducing agent discharged from the doser to move through the mount cap and into the injection cone, and the port plate having a substantially flat shape across the outer end of the mount cylinder.

Clause 10: The reducing agent mixer of any other suitable clause, combination of clauses, or combination of clause limitations, wherein exhaust guide includes a plurality of flow distribution walls that divide the exhaust-distribution duct into a plurality of flow tubes and each of the flow tubes is shaped to discharge exhaust gas at a different location around the inlet aperture of the injection cone so that exhaust gas is distributed around the injection cone when exhaust gas flows through the reducing agent mixer.

Clause 11: The reducing agent mixer of any other suitable clause, combination of clauses, or combination of clause limitations, wherein the plurality of flow distribution walls extend into the gap between the mount cylinder and the injection cone.

Clause 12: The reducing agent mixer of any other suitable clause, combination of clauses, or combination of clause limitations, wherein the injector cone includes an outer dome that forms the inlet aperture of the injector cone and a flared wall that forms an outlet aperture of the injector cone, the outer dome has a dome shape, and the flared wall has a hollow frusto-conical shape that extends from the outer dome.

Clause 13: The reducing agent mixer of any other suitable clause, combination of clauses, or combination of clause limitations, wherein the doser attachment of the reducing agent delivery device includes a mount cap outside the mixing can that is coupled to the doser and a mount cylinder that extends through the can aperture formed in the outer wall of the mixing can, the mount cylinder encircling the outer dome of the injection cone at least a portion of the flared wall of the injection cone to define a gap therebetween, and the gap is in fluid communication with the exhaust guide.

Clause 14: The reducing agent mixer of any other suitable clause, combination of clauses, or combination of clause limitations, wherein the mount cap includes a coupler flange configured to be coupled to the doser by fasteners and a port plate that extends over the mount cylinder outside the mixing can to close an outer end of the mount cylinder, the port plate formed to include an injection port aligned with the inlet aperture of the injection cone to allow reducing agent discharged from the doser to move through the mount cap and into the injection cone, and the port plate having a substantially flat shape across the outer end of the mount cylinder.

Clause 15: The reducing agent mixer of any other suitable clause, combination of clauses, or combination of clause limitations, wherein exhaust guide includes an exhaust-distribution duct that extends from the mount cylinder and a plurality of flow distribution walls that divide the exhaust-distribution duct into a plurality of flow tubes, each of the flow tubes is shaped to discharge exhaust gas at a different location around the injection cone, and the plurality of flow distribution walls extend into the gap between the mount cylinder and the injection cone so that exhaust gas is distributed around the inlet aperture of the injection cone when exhaust gas flows through the reducing agent mixer.

Clause 16: A reducing agent mixer adapted for use in an exhaust treatment system associated with an internal combustion engine, the reducing agent mixer comprising a mixing can arranged around a central axis and shaped to define an internal space, the mixing can including an outer wall formed to include a can aperture and an upstream baffle formed to include guide aperture, and a reducing agent delivery device including a doser attachment configured to support a doser outside the internal space of the mixing can in a position to discharge reducing agent through the can aperture, an injection cone configured to conduct reducing agent discharged from a doser outside the mixing can into the internal space of the mixing can, and an exhaust guide including an exhaust-distribution duct spaced apart from the outer wall of the mixing can, wherein the exhaust-distribution duct forms an exhaust-receipt opening aligned with the guide aperture so that exhaust from the guide aperture enters the exhaust-distribution duct when exhaust gas flows through the reducing agent mixer and the exhaust-distribution duct is shaped to extend from the exhaust-receipt opening toward and around the injection cone so as to distribute exhaust gas to all sides of the injection cone when exhaust gas flows through the reducing agent mixer.

Clause 17: The reducing agent mixer of any other suitable clause, combination of clauses, or combination of clause limitations, wherein exhaust guide includes a plurality of flow distribution walls that divide the exhaust-distribution duct into a plurality of flow tubes and each of the flow tubes is shaped to discharge exhaust gas at a different location around the inlet aperture of the injection cone.

Clause 18: The reducing agent mixer of any other suitable clause, combination of clauses, or combination of clause limitations, wherein the exhaust-distribution duct terminates before it reaches the upstream baffle such that the reducing agent delivery device is spaced apart from the upstream baffle.

Clause 19: The reducing agent mixer of any other suitable clause, combination of clauses, or combination of clause limitations, wherein the exhaust-distribution duct extends through guide aperture of the upstream baffle and the exhaust-receipt opening is spaced from the guide opening in upstream baffle.

Clause 20: The reducing agent mixer of any other suitable clause, combination of clauses, or combination of clause limitations, wherein the plurality of flow distribution walls divide the exhaust receipt opening into a plurality of flow ports each aligned with the guide aperture formed in the upstream baffle so that exhaust moving through the guide aperture is divided by the flow distribution walls when exhaust gas flows through the reducing agent mixer.

Clause 21: The reducing agent mixer of any other suitable clause, combination of clauses, or combination of clause limitations, wherein the upstream baffle includes a first section arranged to extend in a plane generally perpendicular to the central axis and a second section arranged to extend in a plane generally parallel to the central axis, and the guide aperture formed in the upstream baffle is formed through portions of both the first section and the second section of the upstream baffle.

Clause 22: The reducing agent mixer of any other suitable clause, combination of clauses, or combination of clause limitations, wherein the doser attachment of the reducing agent delivery device includes a mount cap outside the mixing can and a mount cylinder that extends through the can aperture formed in the outer wall of the mixing can, the mount cylinder encircling at least a portion of the injection cone to define a gap therebetween, and the gap is in fluid communication with the exhaust-distribution duct.

Clause 23: The reducing agent mixer of any other suitable clause, combination of clauses, or combination of clause limitations, wherein the mount cap includes a coupler flange configured to be coupled to the doser by fasteners and a port plate that extends over the mount cylinder outside the mixing can to close an outer end of the mount cylinder, the port plate formed to include an injection port aligned with the inlet aperture of the injection cone to allow reducing agent discharged from the doser to move through the mount cap and into the injection cone, and the port plate having a substantially flat shape across the outer end of the mount cylinder.

Clause 24: The reducing agent mixer of any other suitable clause, combination of clauses, or combination of clause limitations, wherein exhaust guide includes a plurality of flow distribution walls that divide the exhaust-distribution duct into a plurality of flow tubes, each of the flow tubes is shaped to discharge exhaust gas at a different location around the injection cone, and the plurality of flow distribution walls extend into the gap between the mount cylinder and the injection cone so that exhaust gas is distributed around the inlet aperture of the injection cone when exhaust gas flows through the reducing agent mixer.

Clause 25: The reducing agent mixer of any other suitable clause, combination of clauses, or combination of clause limitations, wherein the reducing agent delivery device comprises a first cast section and a second cast section coupled to the first cast section; the first cast section forms the mount cap of the doser attachment, the mount cylinder of the doser attachment, and a portion of the exhaust distribution duct are formed by the first cast section; and the second cast section forms the injection cone and a portion of the exhaust distribution duct.

Clause 26: The reducing agent mixer of any other suitable clause, combination of clauses, or combination of clause limitations, wherein exhaust guide includes a plurality of flow distribution walls that divide the exhaust-distribution duct into a plurality of flow tubes, the plurality of flow distribution walls extend into the gap between the mount cylinder and the injection cone, and the second cast section forms the flow distribution walls.

Clause 27. A reducing agent mixer adapted for use in an exhaust treatment system associated with an internal combustion engine, the reducing agent mixer comprising a mixing can arranged around a central axis and shaped to define an internal space, and a reducing agent delivery device including a doser attachment configured to support a doser outside the internal space of the mixing can and an injection cone configured to conduct reducing agent discharged from a doser into the internal space of the mixing can, wherein the doser attachment includes a coupler flange outside the mixing can coupled to the doser, a mount cylinder that extends into the mixing can and encircles a portion of the injection cone, and a port plate having a flat shape that extends over the mount cylinder outside the mixing can and formed to include an injection port, and wherein the injector cone includes an outer dome that forms the inlet aperture aligned with the injector port of the port plate and a flared wall that forms an outlet aperture of the injector cone.

Clause 28: The reducing agent mixer of any other suitable clause, combination of clauses, or combination of clause limitations, wherein the injection port and the inlet aperture are spaced apart from one another and the injection port is smaller than the inlet aperture.

Clause 29: The reducing agent mixer of any other suitable clause, combination of clauses, or combination of clause limitations, wherein the mount cylinder encircles the outer dome of the injection cone and a portion of the flared wall of the injection cone to define a gap therebetween.

Clause 30: The reducing agent mixer of any other suitable clause, combination of clauses, or combination of clause limitations, wherein the reducing agent delivery device includes an exhaust guide that extends around another portion of the flared wall of the injection cone and is configured to collect and distribute exhaust gas around the injection cone when exhaust gas flows through the reducing agent mixer.

Clause 31: The reducing agent mixer of any other suitable clause, combination of clauses, or combination of clause limitations, wherein exhaust guide includes an exhaust-distribution duct that extends from the mount cylinder and a plurality of flow distribution walls that divide the exhaust-distribution duct into a plurality of flow tubes, each of the flow tubes is shaped to discharge exhaust gas at a different location around the injection cone, and the plurality of flow distribution walls extend into the gap between the mount cylinder and the injection cone so that exhaust gas is distributed around the inlet aperture of the injection cone when exhaust gas flows through the reducing agent mixer.

Clause 32: The reducing agent mixer of any other suitable clause, combination of clauses, or combination of clause limitations, wherein the mixing can includes an outer wall formed to include a can aperture through which the reducing agent delivery device extends, an upstream baffle that defines an upstream side of the internal space and formed to include guide aperture, and a downstream baffle that defines a downstream side of the internal space, the exhaust guide includes an exhaust-distribution duct that extends in the upstream direction from the injection cone and forms an exhaust-receipt opening that opens facing in the upstream direction and that is aligned with the guide aperture so that exhaust moving through the guide aperture enters the exhaust guide for distribution around the inlet aperture of the injection cone when exhaust gas flows through the reducing agent mixer.

The invention claimed is:

1. A reducing agent mixer adapted for use in an exhaust treatment system associated with an internal combustion engine, the reducing agent mixer comprising
   a mixing can arranged around a central axis and shaped to define an internal space, the internal space adapted to house mixing of exhaust gas and reducing agent when exhaust gas moves along the central axis in a downstream direction through the reducing agent mixer,
   a doser mounted outside the mixing can and configured to discharge predetermined amounts of reducing agent into the internal space of the mixing can, and
   a reducing agent delivery device including a doser attachment that supports the doser outside the internal space of the mixing can, an injection cone that conducts reducing agent discharged from the doser into the internal space of the mixing can, and an exhaust guide configured to provide means for collecting exhaust gas moving into the reducing agent mixer and for distributing the exhaust gas around an inlet aperture of the injection cone so that exhaust gas moving through the injection cone lines an internal surface of the injection cone and blocks deposition of reducing agent onto an internal surface of the mixing cone, wherein the mixing can includes an outer wall formed to include a can aperture through which the reducing agent delivery device extends, an upstream baffle that defines an upstream side of the internal space and formed to include guide aperture, and a downstream baffle that defines a downstream side of the internal space, the exhaust guide includes an exhaust-distribution duct that extends in the upstream direction from the injection cone and forms an exhaust-receipt opening that opens facing in the upstream direction and that is aligned with the guide aperture so that exhaust moving through the guide aperture enters the exhaust guide for distribution around the inlet aperture of the injection cone when exhaust gas flows through the reducing agent mixer.

2. The reducing agent mixer of claim 1, wherein exhaust guide includes a plurality of flow distribution walls that divide the exhaust-distribution duct into a plurality of flow tubes and each of the flow tubes is shaped to discharge exhaust gas at a different location around the injection cone so that exhaust gas is distributed around the inlet aperture of the injection cone when exhaust gas flows through the reducing agent mixer.

3. The reducing agent mixer of claim 2, wherein the exhaust-distribution duct terminates downstream of the guide aperture formed in the upstream baffle such that the reducing agent delivery device is spaced apart from the upstream baffle and some exhaust gas moving through the guide aperture does not enter the exhaust-distribution duct when exhaust gas flows through the reducing agent mixer.

4. The reducing agent mixer of claim 2, wherein the exhaust-distribution duct extends through guide aperture of the upstream baffle and terminates upstream of the guide aperture.

5. The reducing agent mixer of claim 2, wherein the plurality of flow distribution walls divide the exhaust receipt opening into a plurality of flow ports each aligned with the guide aperture formed in the upstream baffle so that exhaust moving through the guide aperture enters the exhaust guide for distribution around the inlet aperture of the injection cone when exhaust gas flows through the reducing agent mixer.

6. The reducing agent mixer of claim 5, wherein the upstream baffle includes a first section arranged to extend in a plane generally perpendicular to the central axis and a second section arranged to extend in a plane generally parallel to the central axis, and the guide aperture formed in the upstream baffle is formed through portions of both the first section and the second section of the upstream baffle.

7. The reducing agent mixer of claim 1, wherein the doser attachment of the reducing agent delivery device includes a mount cap outside the mixing can that is coupled to the doser and a mount cylinder that extends through the can aperture formed in the outer wall of the mixing can, the mount cylinder encircling at least a portion of the injection cone to define a gap therebetween, and the gap is in fluid communication with the exhaust guide.

8. The reducing agent mixer of claim 7, wherein the mount cap includes a coupler flange configured to be coupled to the doser by fasteners and a port plate that extends over the mount cylinder outside the mixing can to close an outer end of the mount cylinder, the port plate formed to include an injection port aligned with the inlet aperture of the injection cone to allow reducing agent discharged from the doser to move through the mount cap and into the injection cone, and the port plate having a substantially flat shape across the outer end of the mount cylinder.

9. The reducing agent mixer of claim 7, wherein exhaust guide includes a plurality of flow distribution walls that divide the exhaust-distribution duct into a plurality of flow tubes and each of the flow tubes is shaped to discharge exhaust gas at a different location around the inlet aperture of the injection cone so that exhaust gas is distributed around the injection cone when exhaust gas flows through the reducing agent mixer.

10. The reducing agent mixer of claim 9, wherein the plurality of flow distribution walls extend into the gap between the mount cylinder and the injection cone.

11. The reducing agent mixer of claim 1, wherein the injector cone includes an outer dome that forms the inlet aperture of the injector cone and a flared wall that forms an outlet aperture of the injector cone, the outer dome has a dome shape, and the flared wall has a hollow frusto-conical shape that extends from the outer dome.

12. The reducing agent mixer of claim 11, wherein the doser attachment of the reducing agent delivery device includes a mount cap outside the mixing can that is coupled to the doser and a mount cylinder that extends through the can aperture formed in the outer wall of the mixing can, the mount cylinder encircling the outer dome of the injection cone at least a portion of the flared wall of the injection cone to define a gap therebetween, and the gap is in fluid communication with the exhaust guide.

13. The reducing agent mixer of claim 12, wherein the mount cap includes a coupler flange configured to be coupled to the doser by fasteners and a port plate that extends over the mount cylinder outside the mixing can to close an outer end of the mount cylinder, the port plate formed to include an injection port aligned with the inlet aperture of the injection cone to allow reducing agent discharged from the doser to move through the mount cap and into the injection cone, and the port plate having a substantially flat shape across the outer end of the mount cylinder.

14. The reducing agent mixer of claim 13, wherein exhaust guide includes an exhaust-distribution duct that extends from the mount cylinder and a plurality of flow distribution walls that divide the exhaust-distribution duct into a plurality of flow tubes, each of the flow tubes is shaped to discharge exhaust gas at a different location around the injection cone, and the plurality of flow distribution walls extend into the gap between the mount cylinder and the injection cone so that exhaust gas is distributed around the inlet aperture of the injection cone when exhaust gas flows through the reducing agent mixer.

15. A reducing agent mixer adapted for use in an exhaust treatment system associated with an internal combustion engine, the reducing agent mixer comprising
a mixing can arranged around a central axis and shaped to define an internal space, the mixing can including an outer wall formed to include a can aperture, and
a reducing agent delivery device including a doser attachment configured to support a doser outside the internal space of the mixing can in a position to discharge reducing agent through the can aperture, an injection cone configured to conduct reducing agent discharged from a doser outside the mixing can into the internal space of the mixing can, a mount cylinder that extends through the can aperture formed in the outer wall of the mixing can, the mount cylinder encircling at least a portion of the injection cone to define a gap therebetween, and an exhaust guide including an exhaust-distribution duct spaced apart from the outer wall of the mixing can and a plurality of flow distribution walls that divide the exhaust-distribution duct into a plurality of flow tubes, wherein each of the flow tubes is shaped to discharge exhaust gas at a different location around the injection cone, wherein the plurality of flow distribution walls extend into the gap between the mount cylinder and the injection cone so that exhaust gas is distributed around the inlet aperture of the injection cone when exhaust gas flows through the reducing agent mixer.

16. The reducing agent mixer of claim 15, wherein the plurality of flow distribution walls divide an exhaust receipt opening into a plurality of flow ports each aligned with a guide aperture formed in an upstream baffle so that exhaust moving through the guide aperture is divided by the flow distribution walls when exhaust gas flows through the reducing agent mixer.

17. The reducing agent mixer of claim 16, wherein the upstream baffle includes a first section arranged to extend in a plane generally perpendicular to the central axis and a second section arranged to extend in a plane generally parallel to the central axis, and the guide aperture formed in the upstream baffle is formed through portions of both the first section and the second section of the upstream baffle.

18. A reducing agent mixer adapted for use in an exhaust treatment system associated with an internal combustion engine, the reducing agent mixer comprising
a mixing can arranged around a central axis and shaped to define an internal space, and
a reducing agent delivery device including a doser attachment configured to support a doser outside the internal space of the mixing can and an injection cone configured to conduct reducing agent discharged from a doser into the internal space of the mixing can, wherein the doser attachment includes a coupler flange outside the mixing can coupled to the doser, a mount cylinder that extends into the mixing can and encircles a portion of the injection cone, and a port plate having a flat shape that extends over the mount cylinder outside the mixing can and formed to include an injection port, and wherein the injector cone includes an outer dome that forms the inlet aperture aligned with the injector port of the port plate and a flared wall that forms an outlet aperture of the injector cone.

* * * * *